United States Patent

Yamada et al.

Patent Number: 6,026,422
Date of Patent: Feb. 15, 2000

[54] LARGE-SCALE MULTIPLICATION WITH ADDITION OPERATION METHOD AND SYSTEM

[75] Inventors: So Yamada; Shinjiro Inabata; Nobuaki Miyakawa, all of Ebina, Japan

[73] Assignee: Fuji Xerox Co., Ltd., Tokyo, Japan

[21] Appl. No.: 09/031,889

[22] Filed: Feb. 27, 1998

[30] Foreign Application Priority Data

Mar. 3, 1997 [JP] Japan ..................................... 9-048320

[51] Int. Cl.[7] ........................................................ G06F 17/11
[52] U.S. Cl. ........................... 708/523; 708/501; 708/446
[58] Field of Search ..................................... 708/523, 501, 708/603, 446

[56] References Cited

U.S. PATENT DOCUMENTS

| | | | |
|---|---|---|---|
| 5,719,964 | 2/1998 | Linzer et al. | 708/603 |
| 5,784,306 | 7/1998 | Ogletree | 708/523 |
| 5,847,981 | 12/1998 | Kelley et al. | 708/523 |
| 5,859,789 | 1/1999 | Sidwell | 708/523 |

FOREIGN PATENT DOCUMENTS

| | | |
|---|---|---|
| 63-262758 | 10/1988 | Japan . |
| 4-141769 | 5/1992 | Japan . |

OTHER PUBLICATIONS

Shirakawa, S. et al., The Architecture of a Molecular Orbital calculation Engine (MOE), pp. 45–50.

Obara S. et al., "Efficient Recursive Computation of Molecular Integrals Over Cartesian Gaussian Functions", J. Chem Phys. 84(7), Apr. 1986.

*Primary Examiner*—David H. Malzahn
*Attorney, Agent, or Firm*—Oliff & Berridge, PLC

[57] ABSTRACT

Electron repulsion integrals are classified according to atomic nucleus coordinates, etc., coefficients are generated and are stored in a data memory, multiplication with addition operation is executed according to a product sum procedure of auxiliary integrals of recursive order 1 or less, and the result is stored in the data memory. Next, density matrix element is stored in the data memory, a multiplication with addition operation procedure of an electron repulsion integral of recursive order 2 not containing any procedure of recursive order 1 or less is generated, and an instruction memory is updated. Multiplication with addition operation is executed while data is read from the data memory, and the result is stored in the data memory. At the termination of the product sum procedure, calculation of electron repulsion integral gRstu is complete and the Fock matrix element value is updated. The Fock matrix element containing electron repulsion integral when a linear combination constant to minimize the expected value of molecule energy required for molecular orbital calculation is found is thus found by performing recursive multiplication with addition operation.

14 Claims, 9 Drawing Sheets

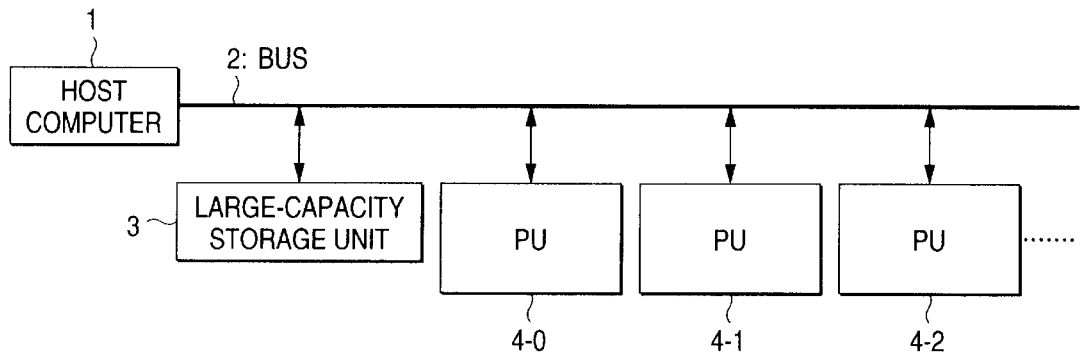
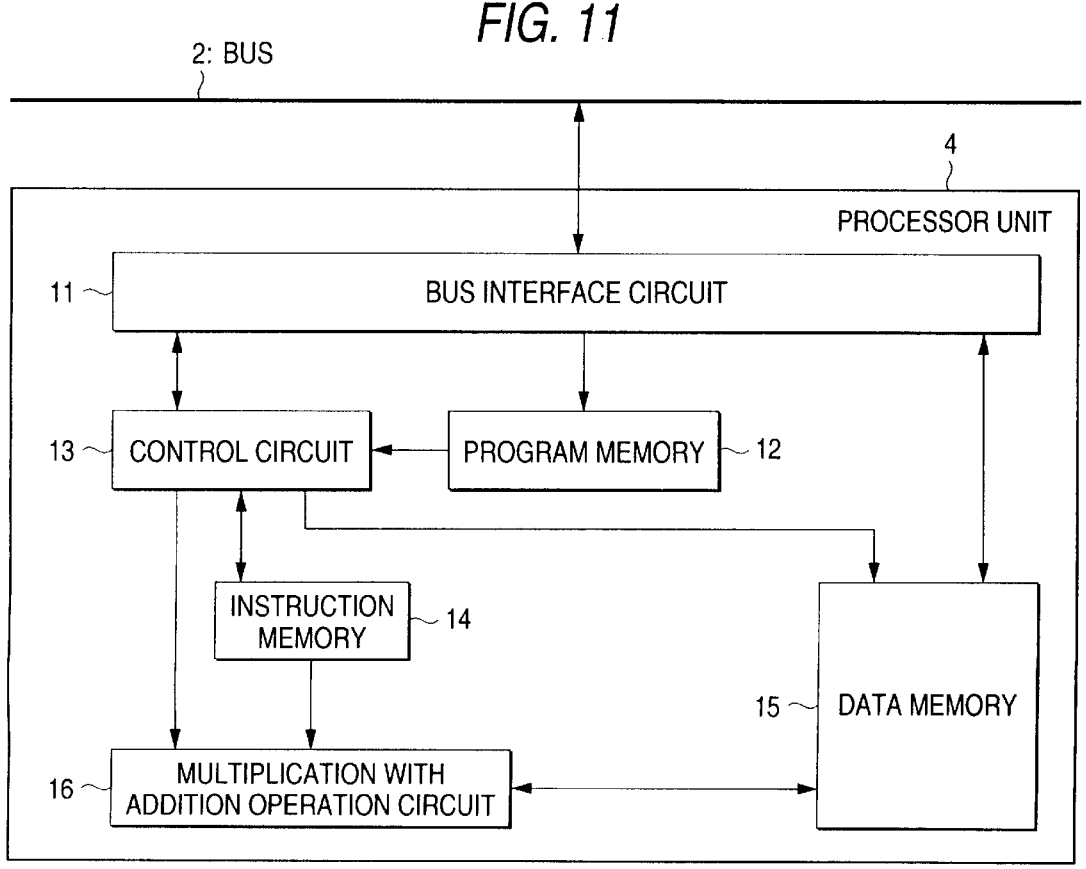

LARGE-SCALE MULTIPLICATION WITH ADDITION OPERATION METHOD AND SYSTEM

BACKGROUND OF THE INVENTION

This invention relates to a large-scale multiplication with addition operation (mul-add operation) method and system and in particular to a large-scale multiplication with addition operation method and system for efficiently performing recursive multiplication with addition operation.

In image processing and simulation of physical phenomenon, continuous integral or differential calculation is often replaced with a discrete form, for example, a recursion formula to obtain an approximate numeric solution. An example is a polynomial containing a plurality of terms different in degree expressed in the following expression (1) in actual calculation performed by hardware of a computer, etc.,:

$$y = a_0 X^n + a_1 X^{n-1} + a_2 X^{n-2} + \ldots + a_{n-1} X + a_n \quad (1)$$

As a technique of efficiently performing the calculation of the expression (1), the expression (1) is represented in the recursive multiplication with addition form for replacement with simple multiply with add processing repetition. Recursive representation equivalent to the expression (1) is shown in expression (2):

$$\left. \begin{array}{l} s_0 = a_0 \\ s_1 = s_0 x + a_1 \\ s_2 = s_1 x + a_2 \\ \vdots \\ s_n = s_{n-1} x + a_n \\ y = s_n \end{array} \right\} \quad (2)$$

Thus, the value of the polynomial of expression (1) can be found efficiently by simple repetition of recursive multiplication with addition operation. Therefore, if hardware capable of performing simple multiplication with addition operation at high speed is used, the above-mentioned processing can be performed efficiently. In expression (2) shown above, multiplication with addition operation may be performed n times recursively to obtain the value of sn. In the description to follow, the number of times recursive multiplication with addition operation is performed corresponding to the degree of a polynomial will be referred to as recursive order n. In the examples in expressions (1) and (2), the recursive order matches the number of times recursive multiplication with addition operation is performed.

Some simulation in a chemical field requires recursive calculation in complicated form. An example is ab initio molecular orbital calculation using a variational method. The purpose of this ab initio molecular orbital calculation is to describe electron behavior in a molecule in first principle calculation without using any empirical parameters.

The ab initio molecular orbital calculation method is positioned as the foundation for molecule simulation and is used to analyze material structures and chemical reaction in detail as an industrially important technique. In the ab initio molecular orbital calculation method, the reciprocal of an exponential function having as an exponent, the distance between the atomic nucleus of each atom and each orbital electron making up a molecule multiplied by an empirical constant (which is called orbital exponent) is used as an atomic orbital, which will be hereinafter referred to as a basis function (or simply z basis), and a plurality of the basis functions are provided for one atom. The basis functions are linearly combined, thereby describing the wave function of the orbital electron in the molecule, namely, the molecular orbital. Determining coefficients for linear combination of the basis functions in the molecular orbital is the main processing content of the ab initio molecular orbital calculation method.

More particularly, spatial (electron spin is not considered) orbit $\phi i$ of electron in molecule can be approximated by linear combination of basis functions $\chi$ as shown in the following expression (3) and (2n electron system) molecular state (wave function) $\psi$ satisfying Pauli exclusion principle considering electron spin can be expressed by Slater determinant shown in the following expression (4):

$$\phi_i = \Sigma_\mu \chi_\mu C_{\mu i} \quad (3)$$

where i: Number representing ith molecular orbital $\phi$ (i, j, k, l, . . . , each being number of molecular orbital $\phi$)

$\mu$: Number representing $\mu$th basis function $\chi$ ($\mu$, $\nu$, $\lambda$, $\sigma$, . . . , each being number of basis function $\chi$ $\Sigma \mu$: Sum total regarding $\mu$ (sum of N basis functions when the number of basis functions is N)

$C_{\mu i}$: Constant for linear combination $$\Psi(1, 2, \ldots, 2n) = [(2n!)]^{-1/2} \times \quad (4)$$

$$\begin{bmatrix} \phi_1 \alpha(1) & \phi_1 \beta(1) & \phi_2 \alpha(1) & \phi_2 \beta(1) & \ldots & \phi_n \alpha(1) & \phi_n \beta(1) \\ \phi_1 \alpha(2) & \phi_1 \beta(2) & \phi_2 \alpha(2) & \phi_2 \beta(2) & \ldots & \phi_n \alpha(2) & \phi_n \beta(2) \\ \vdots & \vdots & \vdots & \vdots & \vdots & \vdots & \vdots \\ \phi_1 \alpha(2n) & \phi_1 \beta(2n) & \phi_2 \alpha(2n) & \phi_2 \beta(2n) & \ldots & \phi_n \alpha(2n) & \phi_n \beta(2n) \end{bmatrix}$$

where $\alpha(x)$: Upward state of xth electron spin, and $\beta(x)$: Downward state of xth electron spin Expected value of molecular energy e expressed in the following expression (5) can be found from the expression (4) and Hamiltonian H (=H1+H2, H1: one electron portion, H2: two electron portion) for 2n electron system:

$$\epsilon = \int \Psi H \Psi d\tau = \int (H_1 + H_2) \Psi d\tau = 2 \Sigma_i H_i + \Sigma_i \Sigma_j (2 J_{ij} - K_{ij}) \quad (5)$$

where $\Sigma i$ and $E \Sigma j$ denote the sum total regarding n molecular orbitals, Hi denotes core integral, Jij denotes Coulomb integral, and Kij denotes exchange integral.

The expression (5) can be expressed by the following expression (6) at the basis function level and the integral expressed by $[\mu\nu, \lambda\sigma]$ is called electron repulsion integral (ERI):

$$\varepsilon = 2\sum_i \left(\sum_\mu \sum_\nu C_{\mu i} H_{\mu\nu}\right) + \qquad (6)$$

$$\sum_i \sum_j \left\{\sum_\mu \sum_\nu \sum_\lambda \sum_\sigma C_{\mu i} C_{\mu j} C_{\lambda j} C_{\sigma j} (2[\mu\nu, \lambda\sigma] - [\mu\nu, \lambda\sigma])\right\}$$

where $$H_{\mu\nu} = \int \chi_\mu(1) h^{core}(1) \chi_\nu(1) d\nu_1$$

$$h^{core}(1) = -(1/2)\nabla_1^2 - \sum_A (Z_A / r_{1A})$$

$$[\mu\nu, \lambda\sigma] = \int\int \chi_\mu(1)\chi_\nu(1)(1/r_{12})\chi_1(2)\chi_\sigma(2) d\tau_1 d\tau_2$$

$C_{\mu i}$: Constant for linear combination, i=1–n, $\mu$=1–N, n=number of molecular orbitals, N=number of atomic orbitals (bases)

Since the expected value of molecular energy $\epsilon$ in the expression (6) contains unknown linear combination coefficients C, a numeric value cannot be obtained. Hartree-Fock-Roothaan variational method (HFR method) shown in the following expression (7) is known as a method for defining a coefficient matrix having the linear combination coefficients C as elements so as to minimize the expected value $\epsilon$ and finding wave function $\psi$ in a ground state (stable state with minimum energy):

$$\sum_\nu (F_{\mu\nu} - \varepsilon_i S_{\mu\nu}) C_{\nu i} = 0 \qquad (7)$$

$$F_{\mu\nu} = H_{\mu\nu} + \sum_\lambda \sum_\sigma P_{\lambda\sigma}[[\mu\nu, \lambda\sigma] - [\mu\nu, \lambda\sigma]/2]$$

$$\varepsilon_i = H_i + \sum_j (2J_{ij} - K_{ij})$$

$$S_{\mu\nu} = \int \chi_\mu(1)\chi_\nu(1) d\tau_1$$

$$P_{\lambda\sigma} = 2\sum_j C_{\lambda j} C_{\sigma j}$$

where $F_{\mu\nu}$: Fock matrix element, $P_{\lambda\sigma}$: Density matrix element The Fock matrix elements and the density matrix elements have numeric values for 1 to n basis functions $\mu$, $\nu$, $\lambda$, $\sigma$ and are represented in the N×N matrix form. The coefficient matrix C can be found by solving the expression (7). Since the expression (7) exists for each of i=1–n and $\mu$=1–N, n×N simultaneous equations result.

The density matrix P is used to calculate the coefficient matrix C in the above-mentioned expression. Since the density matrix P is calculated from the coefficient matrix C, specifically the density matrix P calculated by previously giving initial value to the coefficient matrix C is used to find a Fock matrix, then a new coefficient matrix C is found. Next, the process is repeated until the difference between the coefficient matrix C on which the density matrix P is based and the coefficient matrix C obtained as the calculation result becomes sufficiently small (self-consistent). If the coefficient matrix C is found, linear combination coefficient is found and molecular orbital can be found.

By the way, the calculation of the Fock matrix from the density matrix P requires the calculation amount and the storage capacity proportional to the fourth power of the number of basis functions. Thus, the ab initio molecular orbital calculation method is applied only to a small-scale molecule system of about 100 atoms under present circumstances. Development of a calculation system dedicated to ab initio molecular orbital calculation with application to a molecule system of more than 1000 atoms in view is indispensable to make molecular theoretical elucidation of life and chemical phenomena more realistic.

That is, a substantially large computation load is calculation of Fock matrix elements containing electron repulsion integral, because calculation for all $\mu$ and $\nu$ is essential and the sum regarding $\lambda$ and $\sigma$ must be calculated for combinations of $\mu$ and $\nu$. Therefore, calculation of $N^4$ electron repulsion integrals is required per self-consistent iterative calculation.

An algorithm suitable for high-speed calculation for the ab initio molecular orbital calculation is shown in document A (S. Obara and A. Saika, "Efficient recursive computation of molecular integrals over Cartesian Gaussian functions," Journal of Chemical Physics, vol.84, no.7, pp.3963–3974, April 1986). In this algorithm, basis function $\chi$ is expressed by the following expression (8):

$$\chi = \chi(r, \zeta, n, R) = (x-R_x)^{nx}(y-R_y)^{ny}(z-R_z)^{nz} exp\{-(r-R)^2\} \qquad (8)$$

where r, n, and R are vectors, r is electron coordinates having components (x, y, z), $\zeta$ is an orbital exponent (spatial extent of wave function), n is an angular momentum index having components (nx, ny, nz), and R is atomic nucleus coordinates at the center of atomic orbital having components (Rx, Ry, Rz). The sum total of the angular momentum index n (nx+ny+nz) represents the angular momentum; when the sum total is 0, it is called s orbit, when 1, p orbit, and when 2, d orbit, . . . To calculate a molecular orbital, a plurality of combinations (n, $\zeta$) are provided for each of atoms constituting the molecule whose orbital is to be calculated and all sets are used as a basis function set. One basis function can be expressed by combination (n, $\zeta$, R).

As described above, the basis function $\mu$, $\nu$, $\lambda$, $\sigma$ is expressed by the angular momentum index, the orbital exponent, and the central atomic nucleus coordinates. However, in the description that follows, for simplifying the representation, angular momentum indexes a, b, c, and d will be used to express electron repulsion integral as [ab, cd] in place of the basis functions $\mu$, $\nu$, $\lambda$, and $\sigma$.

In the algorithm, electron repulsion integral occupying most of calculation for determining linear combination coefficient is expressed by a recursion formula in the form of the sum of terms consisting of products of auxiliary integral and coefficients, shown in the following expression (9) (see expression (39) in the document A):

$$[(a+l_i)b, cd]^{(m)} = (P_i - A_i)(ab, cd) + (W_i - P_i)(ab, cd)^{(m+1)} + \qquad (9)$$

$$\frac{1}{2\zeta} N_i(a) \left\{ [(a-l_i)b, cd]^{(m)} - \frac{\zeta}{\zeta}[(a-l_i)b, cd]^{(m+1)} \right\} +$$

$$\frac{1}{2\zeta} N_i(b) \left\{ [a(b-l_i), cd]^{(m)} - \frac{\zeta}{\zeta}[a(b-l_i), cd]^{(m+1)} \right\} +$$

$$\frac{1}{2(\zeta+\eta)} N_i(c)[ab, (c-l_i)d]^{(m+1)} +$$

$$\frac{1}{2(\zeta+\eta)} N_i(d)[ab, c(d-l_i)]^{(m+1)}$$

where i: Any of x, y, and z components

Similar recursion formulae also hold for [a (b+1i), cd], [ab, (c+1i)d], and [ab, c (d+1i)] and resemble expression (9), but will not be described. In the description to follow, expression (9) and its similar expressions may be collectively called expression (9).

In the above-shown expression (9), $[\cdots]^{(m)}$ represents auxiliary integral, wherein a, b, c, and d are represented as S, p, d, f, . . . corresponding to angular momentum 0, 1, 2, 3, . . . and (m) is an auxiliary index. Auxiliary integral with m=0 matches electron repulsion integral. Further, (a+1i) means that i component of angular momentum a (i is one of x, y, and z) is incremented by one; (a−1i) means that i component of angular momentum a is decremented by one. In addition, Pi, Ai, Wi, $\zeta$, $\rho$, and $\eta$ are constants and Ni (a) and the like are variables dependent on a and i, which are similar to those in the document A and therefore will not be discussed in detail here.

Paying attention to the angular momentum of the leftmost basis function of the four basis functions constituting auxiliary integral, at least one is decreased in eight terms on the right-hand side than the left-hand side by recursion formula expansion using expression (9). If the angular momenta of the four basis functions constituting auxiliary integral are all 0, namely, for [ss, ss]$^{(m)}$, expression (10) shown below (see expression (44) in the document A) can be used to obtain a numeric value. Therefore, electron repulsion integral constituted of the four basis functions having angular momenta of any magnitude can be expressed using auxiliary integral consisting of only basis functions each finally having the angular momentum 0 after expression (9) is repeatedly applied for decreasing the angular momentum; the numeric value of electron repulsion integral can be easily obtained.

$$[0_a 0_b, 0_c 0_d]^{(m)} = (\zeta+\eta)^{-1/2} K(\zeta_a, \zeta_b, A, B) K(\zeta_c, \zeta_d, C, D) F_m(T) \quad (10)$$

Specifically, electron repulsion integral is expressed in the form of the sum of products of eight or less auxiliary integrals and coefficients according to expression (9) and the angular momentum is decreased further according to expression (9) for the auxiliary integrals. This procedure is repeated and all the procedure to auxiliary integral with all angular momenta 0 is recorded. Next, the recorded procedure is reversed starting at the auxiliary integral with all angular momenta 0 having a known numeric value for finding the numeric value of each auxiliary integral and finally obtaining the numeric value of electron repulsion integral.

As an example, the electron repulsion integral [pxpx, pxpx] calculation procedure can be expanded into the following seven recursion formulae of expressions (11)–(17) from expression (9), etc.,:

$$[p_x p_x, p_x p_x]^{(m)} = (Q_x - C_x)[p_x p_x, p_x s]^{(m)} + \quad (11)$$
$$(W_x - Q_x)[p_x p_x, p_x s]^{(m+1)} +$$
$$\{[sp_x, p_x s]^{(m+1)} +$$
$$[p_x s, p_x s]^{(m+1)}\}/2(\zeta+\eta) +$$
$$\{[p_x p_x, ss]^{(m)} - (\rho/\zeta)[p_x p_x, ss]^{(m+1)}\}/2\eta$$

$$[p_x p_x, p_x s]^{(m)} = (Q_x - C_x)[p_x p_x, ss]^{(m)} + \quad (12)$$
$$(W_x - Q_x)[p_x p_x, ss]^{(m+1)} +$$
$$\{[sp_x, ss]^{(m+1)} + [p_x s, ss]^{(m+1)}\}/2(\zeta+\eta)$$

$$[sp_x, p_x s]^{(m)} = (Q_x - C_x)[sp_x, ss]^{(m)} + \quad (13)$$
$$(W_x - Q_x)[sp_x, ss]^{(m+1)} +$$
$$\{[ss, ss]^{(m+1)}/2(\zeta+\eta)$$

$$[p_x s, p_x s]^{(m)} = (Q_x - C_x)[p_x s, ss]^{(m)} + \quad (14)$$
$$(W_x - Q_x)[p_x s, ss]^{(m+1)} +$$
$$\{[ss, ss]^{(m+1)}/2(\zeta+\eta)$$

$$[p_x p_x, ss]^{(m)} = (P_x - B_x)[p_x s, ss]^{(m)} + \quad (15)$$
$$(W_x - P_x)[p_x s, ss]^{(m+1)} +$$
$$\{[ss, ss]^{(m)} - (\rho/\zeta)[ss, ss]^{(m+1)}\}/2\zeta$$

$$[sp_x, ss]^{(m)} = (P_x - B_x)[ss, ss]^{(m)} + \quad (16)$$
$$(W_x - P_x)[ss, ss]^{(m+1)}$$

$$[p_x s, ss]^{(m)} = (P_x - A_x)[ss, ss]^{(m)} + \quad (17)$$
$$(W_x - P_x)[ss, ss]^{(m+1)}$$

The electron repulsion integral [pxpx, pxpx] is [pxpx, pxpx]$^{(O)}$ in auxiliary integral expression and can be expressed in the form of the sum of products of six auxiliary integrals [pxpx, pxs]$^{(O)}$, [pxpx, pxs]$^{(1)}$, [spx, pxs]$^{(1)}$, [pxs, pxs]$^{(1)}$, [pxpx, ss]$^{(O)}$, and [pxpx, ss]$^{(1)}$ and coefficients using expression (11). The auxiliary integrals [pxpx, pxs]$^{(O)}$ and [pxpx, pxs]$^{(1)}$ can be expanded into recursion formulae using expression (12), the auxiliary integral [spx, pxs]$^{(1)}$ can be expanded into a recursion formula using expression (13), the auxiliary integral [pxs, pxs]$^{(1)}$ can be expanded into a recursion formula using expression (14), and the auxiliary integrals [pxpx, ss]$^{(O)}$ and [pxpx, ss]$^{(1)}$ can be expanded into recursion formulae using expression (15).

When a further description is given taking the auxiliary integral [pxpx, pxs]$^{(O)}$ as an example, it can be expressed in the form of the sum of products of four auxiliary integrals [pxpx, ss]$^{(O)}$, [pxpx, ss]$^{(1)}$, [spx, ss]$^{(1)}$, and [pxs, ss]$^{(1)}$ and coefficients using expression (12). Using thus recursion expression expansion repeatedly, [pxpx, pxpx] can be expressed in the form of the product sum of [ss, ss]$^{(m)}$ (where m=0–4) and coefficients finally using expression (16) or (17).

The numeric calculation procedure is executed in the reverse order to the recursion expansion. First, the numeric values of the auxiliary integrals [ss, ss]$^{(m)}$ are provided for m=0–4 and the numeric values of the auxiliary integrals [pxs, ss]$^{(m)}$ and [spx, ss]$^{(m)}$ are found for m=0–3 using expressions (16) and (17). Similar operation is performed to find the numeric values of auxiliary integrals [pxpx, pxs]$^{(O)}$, [pxpx, pxs]$^{(1)}$, [spx, pxs]$^{(1)}$, [spx, pxs]$^{(1)}$, [pxs, pxs]$^{(1)}$, [pxpx, ss]$^{(O)}$, and [pxpx, ss]$^{(1)}$ are found and finally expression (11) can be used to obtain the numeric value of the electron repulsion integral [pxpx, pxpx].

Relating the final numeric value y=sn in expression (2) to the auxiliary integral [pxpx, pxpx]$^{(O)}$ and s1 in expression (2) to the auxiliary integral [pxs, ss]$^{(O)}$, for example, the above-described operation to find the numeric values of the auxiliary integrals [pxpx, pxpx]$^{(O)}$ and [pxs, ss]$^{(O)}$ is recursive calculation and the recursive order of the recursive calculation to find the numeric value of the auxiliary integral [pxpx, pxpx]$^{(O)}$ is larger than the recursive calculation to find the numeric value of the auxiliary integral [pxs, ss]$^{(O)}$.

The ab initio molecular orbital calculation algorithm is represented by a more complicated form as compared with the recursive calculation represented in expression (2) and the recursive order cannot be expressed simply by the number of times multiplication with addition operation is performed. In the description to follow, the numeric value of the maximum one of the angular momenta contained in four basis functions making up electron repulsion integral or auxiliary integral will be called recursive order in the ab initio molecular orbital calculation algorithm. For example, the recursive order to find the numeric value of [ss, ss] is 0 and the recursive orders to find the numeric values of [pxs, ss], [pxs, pxs], and [pxpx, pxpx] are all 1.

A special purpose system for calculation containing electron repulsion integral requiring an enormous amount of calculation wherein recursive calculation is enabled in ab initio molecular orbital calculation is proposed by Shirakawa et al. (Choukousoku bunshikidou keisansenyouki MOEno architecture, Denshi Jyouhou Tuushingakkai gijyutu houkoku, CPSY96-46 (1996-05)). This multiplication with addition operation system comprises a host computer 1, a bus 2, a large-capacity storage unit 3, and processor units 4-0, 4-1, 4-2, ..., as shown in FIG. 10. The host computer 1, the large-capacity storage unit 3, and the processor units 4-0, 4-1, 4-2, ... can communicate with each other through the bus 2.

Calculation in the multiplication with addition operation system will be discussed with reference to FIG. 6. First, the host computer 1 prepares base information based on specification by the user at step 200. The base information consists of parameters such as the position coordinates of the atomic nucleus of each of the atoms constituting a molecule, types of atoms, orbital exponents describing basis functions of an orbital electron in each type of atom, angular momentum, and the like. In the description, the number of basis functions is N. The host computer 1 transmits the base information via the bus 2 to the processor units 4-0, 4-1, 4-2, ... at step 202. It sets a trial value (initial value) of the linear combination coefficient of the basis functions at step 204 and transmits density matrix elements Pij (i=1–N and j=1–N) calculated from the trial value to the large-capacity storage unit 3 at step 206. Next, the host computer 1 determines basis function index assignment for each processor unit at step 208 and transmits it to each processor unit at step 210. The basis function index is provided for specifying the first one of the four basis functions constituting electron repulsion integral.

In the description to follow, electron repulsion integral [rs, tu] will be expressed simply as grstu (r, s, t, u=1–N). Calculation of $N^3$ electron repulsion integrals gRstu (s, t, u=1–N) corresponding to one r=R according to the basis function index, is assigned to one processor unit.

The processor unit calculates electron repulsion integrals gRstu (s, t, u=1–N) for all s, t, and u for assigned r=R and calculates a part of Fock matrix element, F'Rs (s=1–N), according to the following expression (18):

$$F'_{rs} = \Sigma P_{tu}(g_{rstu} - g_{rtsu}/2) \quad (18)$$

In expression (18), Σ means the sum total regarding all t and u and Ptu is a density matrix element stored in the large-capacity storage unit 3. Before calculating one electron repulsion integral, the processor unit previously receives necessary density matrix elements from the large-capacity storage unit 3.

Upon completion of calculation of all electron repulsion integrals, the processor unit transmits F'Rs (s=1–N) to the host computer 1. Upon completion of calculation of all F'rs executed by the processor units according to reception from the host processors at step 212, the host computer 1 adds a core integral amount to the calculation results to find Fock matrix elements at step 214 and calculates linear combination coefficients of basis functions based on the Fock matrix made up of the Fock matrix elements at step 216. Since calculation of the linear combination coefficients uses density matrix elements calculated using linear combination coefficient predetermined as initial value, calculation is repeated until they become self-consistent as described above at step 218. When they become self-consistent, the linear combination coefficient is determined to be the calculation result at step 220. F'rs is only a part of Fock matrix element as described above, but hereinafter will be called Fock matrix element for convenience.

Next, the configuration of each processor unit and electron repulsion integral calculation in the processor unit in the system in FIG. 10 will be discussed. FIG. 11 shows the configuration of the processor unit. The processor unit in FIG. 11 comprises a bus interface circuit 11, a program memory 12, a control circuit 13, an instruction memory 14, a data memory 15, and a multiplication with addition operation circuit 16. The bus interface circuit 11 is connected to the bus 2 and enables communication between the processor unit and the host computer 1 or the large-capacity storage unit 3.

A program transmitted from the host computer 1 through the bus 2 is written into the program memory 12 via the bus interface circuit 11 only once at the molecular orbital calculation starting time. The control circuit 13 mainly generates a multiplication with addition operation procedure in accordance with the program in the program memory 12 and writes the procedure into the instruction memory 14. It also determines the electron repulsion integral calculation sequence, generates a coefficient used for product sum calculation, stores the coefficient in the data memory 15, controls the multiplication with addition operation circuit 16, and issues an address to the data memory 15. The multiplication with addition operation procedure generated by the control circuit 13 is written into the instruction memory 14 and base information transmitted by the host computer 1 to the processor unit, the coefficient generated by the control circuit 13, the auxiliary integral calculation result, and the like are written into the data memory 15. Density and Fock matrix elements are also written into the data memory 15 and their numeric values can be transferred between the data memory 15 and the host computer 1 or the large-capacity storage unit 3 via the bus interface circuit 11 as required. The multiplication with addition operation circuit 16 loads numeric values stored in the data memory 15, performs multiplication with addition operation, and stores the computation result in the data memory 15 according to the multiplication with addition operation procedure stored in the instruction memory 14 under the control of the control circuit 13.

Next, calculation of Fock matrix element F'Rs executed by the processor unit will be discussed with reference to FIG. 3. Upon reception of basis function index R from the host computer 1 at step 100, the control circuit 13 determines the calculation sequence of the electron repulsion integrals to be calculated at step 102. Next, it generates a multiplication with addition operation procedure to obtain numeric values according to the sequence and stores the procedure in the instruction memory 14 at step 104. The same multiplication with addition operation procedure can be used if the electron repulsion integrals whose numeric values are to be found have the same angular momentum combination. Basis function χ can be expressed by the following expression (19) like the above-shown expression (8):

$$\chi = \chi(L, \zeta, X) \quad (19)$$

where X is position coordinates of the central atomic nucleus of basis function χ, ζ is an orbital exponent indicating the spatial extent of the basis function χ, and L is the angular momentum of the basis function χ.

The recursion formula shown in expression (9) indicates that if angular momentum L combinations match, the numeric values of electron repulsion integrals can be obtained by executing the same multiplication with addition operation procedure with change only in the numeric values of coefficients with different position coordinates X and orbital exponents $\zeta$. Therefore, to determine the electron repulsion integral calculation sequence, all electron repulsion integrals to be calculated are classified into types according to L combination and are calculated for each type.

Next, a method of calculating one of the classified electron repulsion integrals will be discussed. First, the control circuit 13 generates a product sum calculation procedure corresponding to the product sum procedure type and stores the product sum calculation procedure in the instruction memory 14 at step 104. Next, the control circuit 13 selects the electron repulsion integral grstu to be calculated from among the electron repulsion integrals in the product sum calculation procedure type at step 106.

This step 106 is equivalent to determining of s, t, and u because R is fixed. Next, the control circuit 13 loads density matrix elements Ptu and Psu from the large-capacity storage unit 3 into the data memory 15 at step 108. The density matrix elements Ptu and Psu are numeric values required to calculate Fock matrix element F'Rs according to expression (18) when the numeric value of gRstu is obtained. Thus, when calculation of the electron repulsion integral is started, the control circuit 13 may request the large-capacity storage unit 3 to send the data for reception of the data in the processor unit by the time the calculation of the electron repulsion integral is complete. The control circuit 13 generates coefficients and numeric values of auxiliary integrals [ss, SS]$^{(m)}$ used for the multiplication with addition operation based on the basis function R, s, t, u information ($\zeta$, X) stored in the data memory 15 and stores them in the data memory 15 at step 110.

Next, the control circuit 13 outputs a multiplication with addition operation start instruction to the multiplication with addition operation circuit 16 at step 112. When receiving the start instruction, the multiplication with addition operation circuit 16 performs multiplication with addition operation while reading necessary data from the data memory 15 according to the multiplication with addition operation procedure written in the instruction memory 14, and stores the computation result in the data memory 15. If it is determined at step 114 that execution of the multiplication with addition operation procedure written in the instruction memory 14 is complete, the calculation of one electron repulsion integral gRstu is complete. Upon completion of the calculation of one electron repulsion integral gRstu, the control circuit 13 uses the multiplication with addition operation circuit 16 to update the values of F'Rs and F'Rt at step 116.

Next, if it is determined at step 118 that a electron repulsion integral not yet calculated is contained in one multiplication with addition operation procedure type, control returns to step 106 at which s, t, and u are changed for calculating the electron repulsion integral not yet calculated without updating the multiplication with addition operation procedure stored in the instruction memory 14. On the other hand, if it is determined at step 118 that all electron repulsion integrals contained in one multiplication with addition operation procedure type have been calculated, control goes to step 120 at which whether or not calculation for all s, t, and u is complete is determined. If it is not complete, control returns to step 104 at which another type of multiplication with addition operation procedure is generated. If it is determined at step 120 that the calculation for all s, t, and u is complete, the calculation of F'Rs (s=1–N) is now complete.

Mention is made here of the size of data written into the instruction memory 14. For description, the multiplication with addition operation performed by the multiplication with addition operation circuit 16 is expressed as the following expression (20):

$$A3 = A2 + C \times A1 \qquad (20)$$

where A1 and A2 are the numeric values of auxiliary integrals obtained so far, C is a coefficient, and A3 is the numeric value of auxiliary integral provided by the multiplication with addition operation. For the multiplication with addition operation circuit 16 to perform the above-described operation, the storage locations of the numeric values in the data memory 15 must be written in the instruction memory 14. That is, to find the numeric value of A3, the storage locations (addresses) at which A1, A2, and C are previously stored in the data memory 15 must be stored in the instruction memory 14. Thus, the instruction memory 14 requires a capacity of about eight bytes for one multiplication with addition operation.

If the maximum angular momenta of basis functions in molecular orbital calculation, etc., is 1, the electron repulsion integral with the amount of data to be written into the instruction memory 14 reaching the maximum is [pp, pp] In this case, the order of the recursive calculation for calculating the electron repulsion integral is 1. At the time, the necessary number of times multiplication with addition operation is executed until the numeric value of the electron repulsion integral [pp, pp] is obtained since starting at auxiliary integral [ss, ss]$^{(m)}$ is 623. Thus, the capacity of the instruction memory 14 required for the multiplication with addition operation is about 5K bytes and the entire processor unit can be formed of a one-chip integrated circuit using a known SRAM. The entire processor unit is thus formed only of a one-chip integrated circuit, whereby information transfer is speeded up and high-speed multiplication with addition operation processing is enabled.

However, the capacity of the instruction memory for storing the multiplication with addition operation procedure is not considered for multiplication with addition operation that can be executed at high speed and in a short time in the above-described system; the executable computation is limited by the capacity of the instruction memory and multiplication with addition operation of large degree or order cannot be executed.

For example, in electron repulsion integral calculation required for molecular orbital calculation, calculation using basis functions with a large angular momentum cannot be executed. That is, considering practical utility of complicated computation such as molecular orbital calculation, at least 2 is required as the maximum value of the angular momenta of the basis functions. In this case, the electron repulsion integral with the amount of data to be written into the instruction memory 14 reaching the maximum is [dd, dd]. The order of the recursive calculation for calculating the electron repulsion integral is 2. Starting at auxiliary integral [ss, ss]$_{(m)}$ to obtain the numeric value of the electron repulsion integral [dd, dd], the necessary number of times multiplication with addition operation is executed is 33936 and the capacity required for the instruction memory 14 becomes about 270K-bytes.

However, to form a one-chip integrated circuit containing the instruction memory 14 together with the control circuit 13 and the multiplication with addition operation circuit 16, a one-chip integrated circuit having an enormous capacity must be designed; it is substantially impossible. Thus, the capacity may be distributed for providing a separate instruction memory outside the chip, but access to the separate instruction memory occurs and the access time to the separate instruction memory would become extremely larger than the access time to the minute instruction memory 14 on one chip, resulting in a factor for hindering high-speed molecular orbital calculation.

A linear recursive operation system is proposed to perform calculation represented in recursive expression at high speed (refer to the Unexamined Japanese Patent Application Publication No. Hei 4-141769). However, the linear recursive operation system is applicable only to operation in a specific format called linear recursive operation and cannot be applied to calculation represented in a complicated recursive format such as ab initio molecular orbital calculation.

An auxiliary integral calculation method of molecular integral is proposed to efficiently calculate electron repulsion integral (refer to the Unexamined Japanese Patent Application Publication No. Sho 63-262758). In the art, a method of performing only calculation of simple auxiliary integrals $[ss, ss]^{(m)}$ at high speed, but calculation containing basis functions with a large angular momentum, namely, complicated recursive calculation of large order cannot be executed.

SUMMARY OF THE INVENTION

It is therefore an object of the invention to provide a large-scale multiplication with addition operation method and system capable of performing large-scale multiplication with addition operation of large degree enabling recursive calculation at high speed.

To the end, according to the invention of aspect 1, there is provided a large-scale multiplication with addition operation method comprising the steps of, to perform computation of predetermined degree as recursive multiplication with addition operation of lower-degree computation than the predetermined degree, generating a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation, storing the generated small multiplication with addition operation procedure in procedure storage means, performing multiplication with addition operation according to the stored small multiplication with addition operation procedure, thereby generating necessary data for multiplication with addition operation from the degree exceeding the boundary degree to the highest degree, generating a multiplication with addition operation procedure to the highest degree from the degree exceeding the boundary degree as a large multiplication with addition operation procedure, replacing the small multiplication with addition operation procedure stored in the procedure storage means with the generated large multiplication with addition operation procedure, and performing multiplication with addition operation according to the large multiplication with addition operation procedure stored in the procedure storage means using the generated data.

According to the invention of aspect 2, there is provided a large-scale multiplication with addition operation method comprising the steps of, to perform computation of predetermined degree as recursive multiplication with addition operation of lower-degree computation than the predetermined degree, classifying computation processes according to a plurality of recursive multiplication with addition operation procedures different in degree, of a product sum procedure of recursive multiplication with addition operation from lowest-degree computation corresponding to the predetermined-degree computation into a first multiplication with addition operation group of small degree from the lowest degree to a previously defined boundary degree and a second multiplication with addition operation group of large degree exceeding the boundary degree, in the computation processes of a first multiplication with addition operation group, generating a multiplication with addition operation procedure from the lowest degree to the highest degree as a specific multiplication with addition operation procedure, storing the generated specific multiplication with addition operation procedure in procedure storage means, and performing multiplication with addition operation according to the stored specific multiplication with addition operation procedure, and in the computation processes of the second multiplication with addition operation group, generating a multiplication with addition operation procedure from the lowest degree to the previously defined boundary degree as a small multiplication with addition operation procedure, storing the generated small multiplication with addition operation procedure in the procedure storage means, performing multiplication with addition operation according to the stored small multiplication with addition operation procedure, thereby generating necessary data for a multiplication with addition operation procedure from the degree exceeding the boundary degree to the highest degree, generating the multiplication with addition operation procedure from the degree exceeding the boundary degree to the highest degree as a large multiplication with addition operation procedure, replacing the stored small multiplication with addition operation procedure with the generated large multiplication with addition operation procedure, and performing multiplication with addition operation according to the large multiplication with addition operation procedure using the generated data.

According to the invention of aspect 3, there is provided a large-scale multiplication with addition operation method comprising the steps of, with computation of an electron repulsion integral used for molecular orbital calculation as computation of predetermined degree using recursion formula representing the physical amount containing the product of basis functions constituting molecular orbital in an integral format, generating and storing a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation, performing multiplication with addition operation according to the stored small multiplication with addition operation procedure, thereby generating necessary data for multiplication with addition operation from the degree exceeding the boundary degree to the highest degree, generating a multiplication with addition operation procedure to the highest degree from the degree exceeding the boundary degree as a large multiplication with addition operation procedure and replacing the stored small multiplication with addition operation procedure with the generated large multiplication with addition operation procedure, and performing multiplication with addition operation using the generated data and according to the large multiplication with addition operation procedure.

According to the invention of aspect 4, there is provided a large-scale multiplication with addition operation method comprising the steps of, with computation of an electron repulsion integral used for molecular orbital calculation as computation of predetermined degree using recursion formula representing the physical amount containing the product of basis functions constituting molecular orbital in an integral format, classifying computation processes according to a plurality of recursive multiplication with addition operation procedures different in degree, of a product sum procedure of recursive multiplication with addition operation from lowest-degree computation corresponding to the predetermined-degree computation into a first multiplication with addition operation group of small degree from the lowest degree to a previously defined boundary degree and a second multiplication with addition operation group of large degree exceeding the boundary degree, in the computation of the first multiplication with addition operation group, generating a multiplication with addition operation procedure from the lowest degree to the highest degree as a specific multiplication with addition operation procedure and performing multiplication with addition operation according to the generated specific multiplication with addition operation procedure, and in the computation of the second multiplication with addition operation group, generating a multiplication with addition operation procedure from the lowest degree to the previously defined boundary degree as a small multiplication with addition operation procedure, storing the generated small multiplication with addition operation procedure, performing multiplication with addition operation according to the stored small multiplication with addition operation procedure, thereby generating necessary data for a multiplication with addition operation procedure from the degree exceeding the boundary degree to the highest degree, generating the multiplication with addition operation procedure from the degree exceeding the boundary degree to the highest degree as a large multiplication with addition operation procedure, replacing the stored small multiplication with addition operation procedure with the generated large multiplication with addition operation procedure, and performing multiplication with addition operation according to the large multiplication with addition operation procedure using the generated data.

In the invention of aspect 5, in the large-scale multiplication with addition operation method of aspect 3 or 4, the generated small multiplication with addition operation procedure is stored in procedure storage means and the small multiplication with addition operation procedure stored in the procedure storage means is replaced with the generated large multiplication with addition operation procedure.

In the invention of aspect 6, in the large-scale multiplication with addition operation method of aspect 1, 2, or 5, the boundary degree is defined based on a storage capacity of the procedure storage means.

In the invention of aspect 7, in the large-scale multiplication with addition operation method of aspect 2 or 4, the size of the recursive multiplication with addition operation procedure is predicted for each of computation processes according to the recursive multiplication with addition operation procedures different in degree and when the predicted size is equal to or less than a predetermined amount, the corresponding recursive multiplication with addition operation procedure is classified into a first multiplication with addition operation process group and when the predicted size is greater than the predetermined amount, the corresponding recursive multiplication with addition operation procedure is classified into a second multiplication with addition operation process group.

In the invention of aspect 8, in the large-scale multiplication with addition operation method of aspect 2 or 4, computation processes according to the recursive multiplication with addition operation procedures different in degree are classified into a first multiplication with addition operation process group not containing a previously defined boundary degree and a second multiplication with addition operation process group containing the boundary degree.

According to the invention of aspect 9, there is provided a large-scale multiplication with addition operation system comprising an instruction memory for storing at least a part of a multiplication with addition operation procedure for performing computation of predetermined degree as recursive multiplication with addition operation of lower-degree computation than the predetermined degree, multiplication with addition operation means for performing multiplication with addition operation according to the multiplication with addition operation procedure-stored in the instruction memory, a data memory for storing the multiplication with addition operation result, and control means for generating a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation, storing the generated small multiplication with addition operation procedure in the instruction memory, storing the multiplication with addition operation result produced according to the small multiplication with addition operation procedure in the data memory, generating a multiplication with addition operation procedure from the degree exceeding the boundary degree to the highest degree as a large multiplication with addition operation procedure, replacing the small multiplication with addition operation procedure stored in the instruction memory with the generated large multiplication with addition operation procedure, and controlling the mul-add operation means to perform multiplication with addition operation using the computation result stored in the data memory and according to the large multiplication with addition operation procedure.

As described in the background of the invention, the result of computation with terms of predetermined degree such as a polynomial can be found efficiently by repetition of simple multiplication with addition operation. However, the procedure storage means for storing a product sum procedure for executing computation of large degree corresponding to complicity of the computation, namely, multiplication with addition operation repetition must be provided with a large capacity and the computation unit is upsized; it takes time in communicating with the procedure storage means and substantially the result cannot be found in a short time. The degree mentioned here corresponds to the level of one or more terms that can be simplified by repeating multiplication with addition operation, of a calculation expression represented by a polynomial, etc. For example, for an n-dimensional term, by assuming that it can be represented by only dimensions of the (n−1) dimensions or less, the degree is n. By assuming that a term in one state can be represented by a state at lower level than the term in the one state, the numeric value representing the one state is the degree.

In the invention of aspect 1, of a product sum procedure for performing recursive multiplication with addition operation for computation of predetermined degree, a multiplication with addition operation procedure from the lowest degree to a previously defined boundary degree is generated as a small multiplication with addition operation procedure, whereby the small multiplication with addition operation procedure becomes a smaller product sum procedure than the product sum procedure for performing computation of the predetermined degree. The generated small multiplication with addition operation procedure is stored in the procedure storage means and multiplication with addition operation is performed according to the stored small multiplication with addition operation procedure, thereby generating necessary data for multiplication with addition operation from the degree exceeding the boundary degree to the highest degree. That is, the multiplication with addition operation result produced according to the small multiplication with addition operation procedure is necessary data for multiplication with addition operation exceeding the boundary degree because of recursive multiplication with addition operation. If the data exists, the multiplication with addition operation from the lowest degree to the previously defined boundary degree can be handled as data. Thus, a multiplication with addition operation procedure from the degree exceeding the boundary degree to the highest degree is generated as a large multiplication with addition operation procedure and the small multiplication with addition operation procedure stored in the procedure storage means is replaced with the generated large multiplication with addition operation procedure. This large multiplication with addition operation procedure also becomes a smaller product sum procedure than the product sum procedure for performing computation of the predetermined degree. Multiplication with addition operation is performed according to the large multiplication with addition operation procedure stored in the procedure storage means using the generated data. Thus, complicated predetermined-degree computation can be performed at high speed as recursive multiplication with addition operation without providing a large capacity for the procedure storage means.

The product sum procedure for executing the predetermined-degree computation by repeating multiplication with addition operation is stored in the procedure storage means. Thus, the product sum procedure stored in the procedure storage means may overflow or underflow depending on the predetermined boundary degree and the procedure storage means may not be used efficiently.

Then, in the invention of aspect 6, for example, if such a boundary degree to satisfy the storage capacity of the procedure storage means is determined based on the storage capacity of the procedure storage means, the product sum procedure matching the storage capacity is stored in the procedure storage means and the procedure storage means can be used efficiently.

A plurality of computations different in degree may be required in predetermined-degree computation of a polynomial, etc. In this case, a product sum procedure of small degree equal to or less than the boundary degree is stored in the procedure storage means and multiplication with addition operation is executed, whereby the procedure storage means can be used efficiently.

Then, in the invention of aspect 2, computation processes according to a plurality of recursive multiplication with addition operation procedures different in degree are classified into the first multiplication with addition operation group of small degree which is equal to or larger than the lowest degree and is equal to or less than the previously defined boundary degree and the second multiplication with addition operation group of large degree exceeding the boundary degree. In the computation of the first multiplication with addition operation group, a multiplication with addition operation procedure from the lowest degree to the highest degree is generated as a specific multiplication with addition operation procedure, the generated specific multiplication with addition operation procedure is stored in procedure storage means, and multiplication with addition operation is performed according to the stored specific multiplication with addition operation procedure. In the computation of the second multiplication with addition operation group, a multiplication with addition operation procedure from the lowest degree to the previously defined boundary degree is generated as a small multiplication with addition operation procedure, the generated small multiplication with addition operation procedure is stored in the procedure storage means, multiplication with addition operation is performed according to the stored small multiplication with addition operation procedure, thereby generating necessary data for a multiplication with addition operation procedure from the degree exceeding the boundary degree to the highest degree, the multiplication with addition operation procedure from the degree exceeding the boundary degree to the highest degree is generated as a large multiplication with addition operation procedure, the stored small multiplication with addition operation procedure is replaced with the generated large multiplication with addition operation procedure, and multiplication with addition operation is performed according to the large multiplication with addition operation procedure using the generated data. Thus, when a plurality of multiplication with addition operation processes different in degree are performed, they can be performed by changing the sequence of computation in response to the degree; a plurality of multiplication with addition operation processes different in degree can be performed at high speed.

The storage capacity of the procedure storage means is preset. Then, as in the invention of aspect 6, if such a boundary degree to satisfy the storage capacity of the procedure storage means is determined based on the storage capacity of the procedure storage means, the product sum procedure matching the storage capacity can be stored in the procedure storage means and multiplication with addition operation processes different in degree can be classified so that the procedure storage means can be used efficiently.

It may be able to be predicted that computation of one degree contained in a plurality of recursive multiplication with addition operations different in degree is simple. Then, as in the invention of aspect 7, the size of the recursive multiplication with addition operation procedure is predicted for each of operation processes according to the recursive multiplication with addition operation procedures different in degree and when the predicted size is equal to or less than a predetermined amount, the corresponding recursive multiplication with addition operation procedure is classified into the first multiplication with addition operation process group and when the predicted size is greater than the predetermined amount, the corresponding recursive multiplication with addition operation procedure is classified into the second multiplication with addition operation process group, whereby the computation processes according to the recursive multiplication with addition operation procedures different in degree can be classified in response to the complicity of multiplication with addition operation, the procedure storage means can be used efficiently, and a plurality of multiplication with addition operation processes different in degree can be performed at high speed.

It may be able to be predicted that computation of one degree contained in a plurality of recursive multiplication with addition operation different in degree is complicated. Then, as in the invention of aspect 8, the mul-add operation processes according to the recursive multiplication with addition operation procedures different in degree are classified into a first multiplication with addition operation process group not containing a previously defined boundary degree and a second multiplication with addition operation process group containing the boundary degree, whereby the operation processes according to the recursive multiplication with addition operation procedures different in degree can be classified in response to the complicity of multiplication with addition operation, the procedure storage means can be used efficiently, and a plurality of multiplication with addition operation processes different in degree can be performed at high speed.

Computation of predetermined degree requiring recursive calculation in complicated form includes molecular orbital calculation in the chemical field. Two-electron integral computation used for the molecular orbital calculation can be expressed using recursion formula representing the physical amount containing the product of basis functions constituting molecular orbital in an integral format.

Then, as in the invention of aspect 3, with computation of a electron repulsion integral expressed using recursion formula as computation of predetermined degree, a multiplication with addition operation procedure from the lowest degree to a previously defined boundary degree, of a product sum procedure of recursive multiplication with addition operation from lowest-degree computation corresponding to the predetermined-degree computation is generated and stored as a small multiplication with addition operation procedure. Therefore, the stored small multiplication with addition operation procedure becomes a smaller product sum procedure than the product sum procedure for performing the computation of the predetermined degree used for the molecular orbital calculation, namely, electron repulsion integral computation. Specifically, it becomes a product sum procedure for some auxiliary integrals. Multiplication with addition operation is performed according to the stored small multiplication with addition operation procedure, thereby generating necessary data for multiplication with addition operation from the degree exceeding the boundary degree to the highest degree. That is, as described above, the multiplication with addition operation result produced according to the small multiplication with addition operation procedure is necessary data for multiplication with addition operation exceeding the boundary degree because of recursive multiplication with addition operation. If the data exists, the multiplication with addition operation from the lowest degree to the previously defined boundary degree can be handled as data. Specifically, it is data for some auxiliary integrals. Thus, a multiplication with addition operation procedure from the degree exceeding the boundary degree to the highest degree is generated as a large multiplication with addition operation procedure and the stored small multiplication with addition operation procedure is replaced with the generated large multiplication with addition operation procedure. This large multiplication with addition operation procedure also becomes a smaller product sum procedure than the product sum procedure for performing computation of the predetermined degree. Multiplication with addition operation is performed using the data and according to the large multiplication with addition operation procedure. Thus, even for molecular orbital calculation requiring recursive calculation in complicated form, its computation can be performed at high speed as recursive multiplication with addition operation performed starting at multiplication with addition operation of lower degree.

Molecular orbital calculation may require a plurality of computations different in degree, for example, electron repulsion integral. In this case, a product sum procedure of small degree equal to or less than the boundary degree is stored in the procedure storage means and multiplication with addition operation is executed, so that the procedure storage means can be used efficiently.

Then, in the invention of aspect 4, with computation of an electron repulsion integral used for molecular orbital calculation as computation of predetermined degree using recursion formula representing the physical amount containing the product of basis functions constituting molecular orbital in an integral format, computation processes according to a plurality of recursive multiplication with addition operation procedures different in degree, of a product sum procedure of recursive multiplication with addition operation from lowest-degree computation corresponding to the predetermined-degree computation are classified into the first multiplication with addition operation group of small degree from the lowest degree to a previously defined boundary degree and the second multiplication with addition operation group of large degree exceeding the boundary degree. In the computation of the first multiplication with addition operation group, a multiplication with addition operation procedure from the lowest degree to the highest degree is generated as a specific multiplication with addition operation procedure and multiplication with addition operation is performed according to the generated specific multiplication with addition operation procedure. In the computation of the second multiplication with addition operation group, a multiplication with addition operation procedure from the lowest degree to the previously defined boundary degree is generated as a small multiplication with addition operation procedure, the generated small multiplication with addition operation procedure is stored, multiplication with addition operation is performed according to the stored small multiplication with addition operation procedure, thereby generating necessary data for a multiplication with addition operation procedure from the degree exceeding the boundary degree to the highest degree, the multiplication with addition operation procedure from the degree exceeding the boundary degree to the highest degree is generated as a large multiplication with addition operation procedure, the stored small multiplication with addition operation procedure is replaced with the generated large multiplication with addition operation procedure, and multiplication with addition operation is performed according to the large multiplication with addition operation procedure using the generated data. Thus, when a plurality of multiplication with addition operation processes different in degree, for example, different electron repulsion integrals are performed, they can be performed by changing the sequence of computation in response to the degree and be performed; a plurality of multiplication with addition operation processes different in degree can be performed at high speed.

Although the result of computation of predetermined degree can be found efficiently by repeating simple multiplication with addition operation, the procedure storage means for storing a product sum procedure for executing computation of large degree corresponding to complicity of the computation, namely, multiplication with addition operation repetition must be provided with a large capacity. Then, as in the invention of aspect 5, the generated small multiplication with addition operation procedure is stored in the procedure storage means and the small multiplication with addition operation procedure stored in the procedure storage means is replaced with the generated large multiplication with addition operation procedure, whereby the molecular orbital calculation of complicated predetermined-degree computation can be performed at high speed as recursive multiplication with addition operation without providing a large capacity for the procedure storage means.

The product sum procedure stored in the procedure storage means may overflow or underflow depending on the predetermined boundary degree and the procedure storage means may not be used efficiently. Then, as in the invention of aspect 6, for example, if such a boundary degree to satisfy the storage capacity of the procedure storage means is determined based on the storage capacity of the procedure storage means, the product sum procedure matching the storage capacity is stored in the procedure storage means and the procedure storage means can be used efficiently.

Further, it may be able to be predicted that computation of one degree contained in a plurality of recursive multiplication with addition operations different in degree is complicated. Then, as in the invention of aspect 8, computation processes according to the recursive multiplication with addition operation procedures different in degree are classified into a first multiplication with addition operation process group not containing a previously defined boundary degree and a second multiplication with addition operation process group containing the boundary degree, whereby the recursive multiplication with addition operation procedures different in degree for which it is predicted that multiplication with addition operation is complicated can be classified, the procedure storage means can be used efficiently, and the molecular orbital calculation of complicated predetermined-degree computation can be performed at high speed as recursive multiplication with addition operation.

The large-scale multiplication with addition operation method can be realized by the large-scale multiplication with addition operation system as in the invention of aspect 9. This large-scale multiplication with addition operation system uses control means to generate a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation, and store the generated small multiplication with addition operation procedure in an instruction memory. The instruction memory is provided for storing at least a part of a multiplication with addition operation procedure for performing computation of predetermined degree as recursive multiplication with addition operation of lower-degree computation than the predetermined degree, namely, small or large multiplication with addition operation procedure. The control means stores the multiplication with addition operation result produced by executing the small multiplication with addition operation procedure stored in the instruction memory in a data memory. That is, multiplication with addition operation means performs multiplication with addition operation according to the multiplication with addition operation procedure stored in the instruction memory and the multiplication with addition operation result is stored in the data memory. The control means generates a multiplication with addition operation procedure from the degree exceeding the boundary degree to the highest degree as a large multiplication with addition operation procedure, replaces the small multiplication with addition operation procedure stored in the instruction memory with the generated large multiplication with addition operation procedure, and performs multiplication with addition operation using the computation result stored in the data memory and according to the large multiplication with addition operation procedure, whereby if computation is complicated and of large degree equivalent to multiplication with addition operation repetition, the result of computation of predetermined degree can be found efficiently by repeating simple multiplication with addition operation.

BRIEF DESCRIPTION OF THE DRAWINGS

In the accompanying drawings:

FIG. 10 is a block diagram to show a conventional multiplication with addition operation system; and FIG. 11 is a block diagram to show the configuration of a processor unit in the conventional multiplication with addition operation system in FIG. 10.

DETAILED DESCRIPTION OF THE PREFERRED EMBODIMENTS

Figure 1:
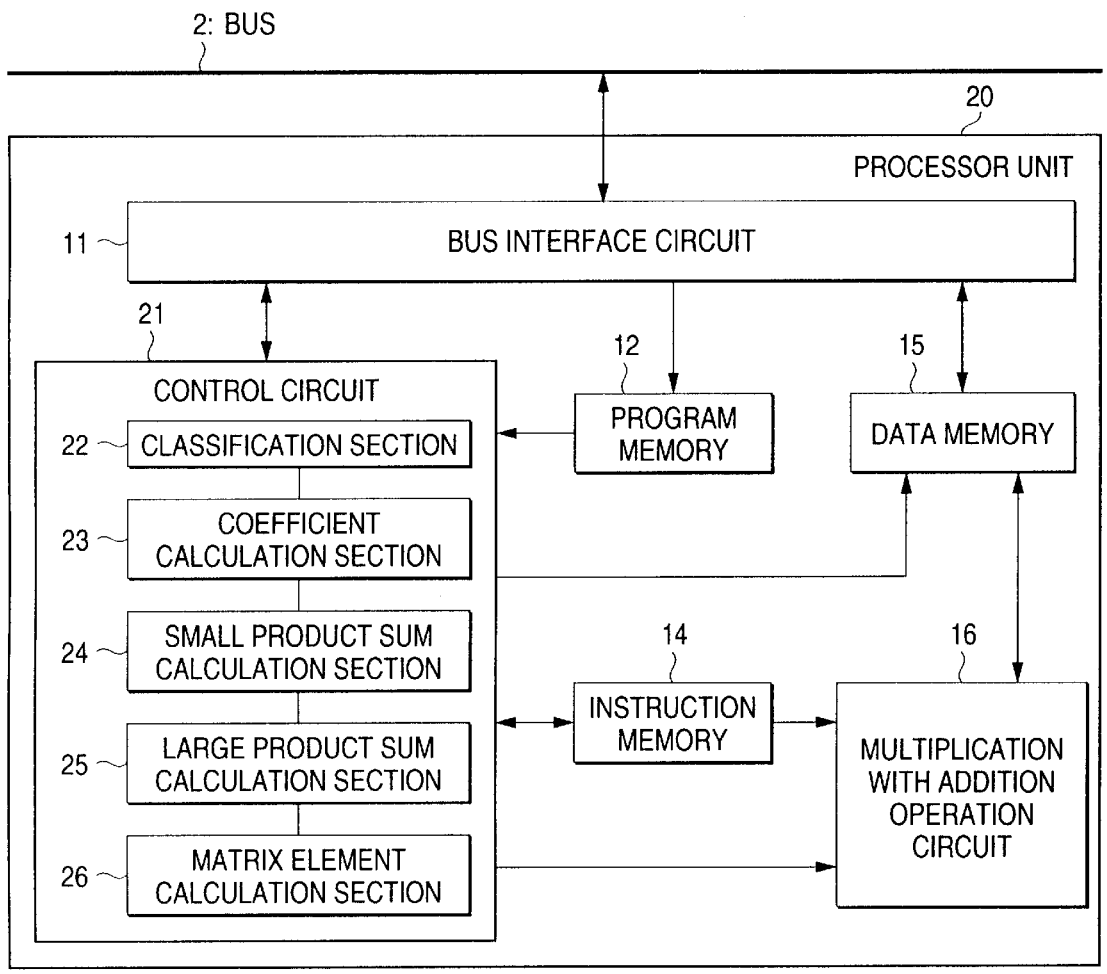
FIG. 1 is a block diagram to show the configuration of a processor unit according to a first embodiment of the invention.

Referring now to the accompanying drawings, there are shown preferred embodiments of the invention.

First embodiment

A first embodiment of the invention is application of the invention to ab initio molecular orbital calculation. Parts identical with or similar to those previously described with reference to FIG. 10 are denoted by the same reference numerals in FIG. 2 and will not be discussed in detail again.

Figure 2:
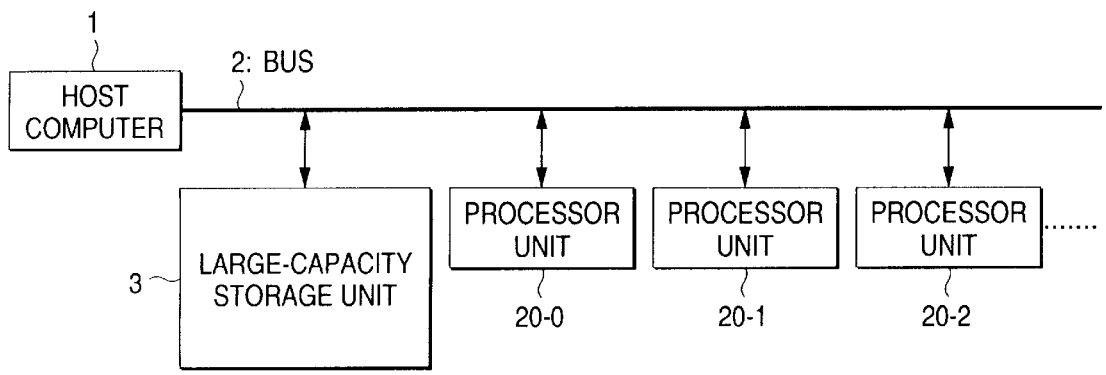
FIG. 2 is a block diagram to show a multiplication with addition operation system according to the first embodiment of the invention.
Figure 3:
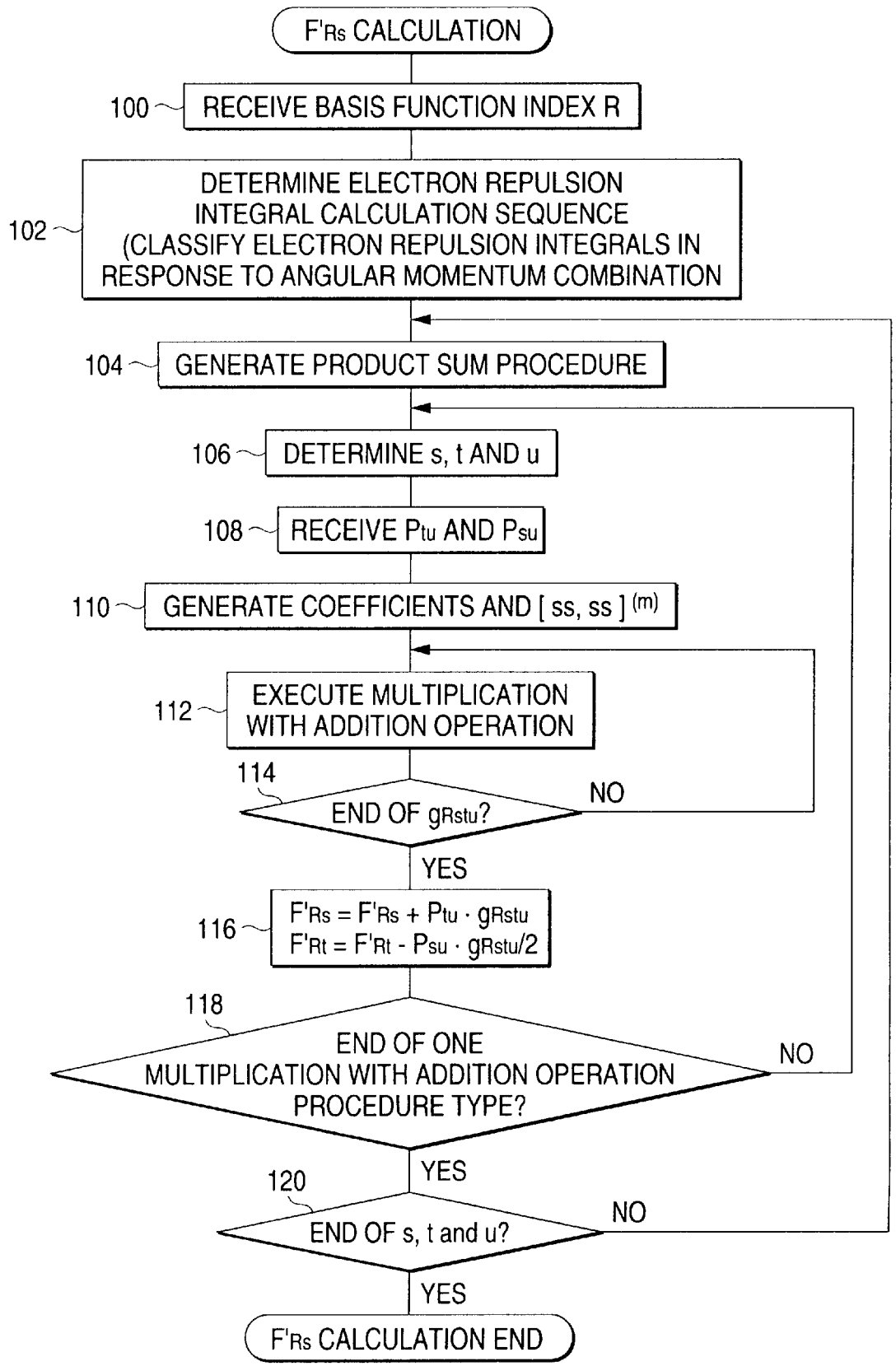
FIG. 3 is a flowchart to show a conventional calculation method.

A multiplication with addition operation (mul-add operation) system of the embodiment comprises a host computer 1, a bus 2, a large-capacity storage unit 3, and processor units 20-0, 20-1, 20-2, . . . , described later, as shown in FIG. 2. The host computer 1, the large-capacity storage unit 3, and the processor units 20-0, 20-1, 20-2, can communicate with each other through the bus 2.

Each processor unit of the multiplication with addition operation system of the embodiment comprises a bus interface circuit 11, a program memory 12, a control circuit 21, an instruction memory 14, a data memory 15, and a multiplication with addition operation circuit 16, as shown in FIG. 1. The bus interface circuit 11 is connected to the bus 2 and enables communication between the processor unit and the host computer 1 or the large-capacity storage unit 3. The control circuit 21 corresponds to control means of the invention. It can be of a classification configuration containing a classification section 22, a coefficient calculation section 23, a small product sum procedure calculation section 24, a large product sum procedure calculation section 25, and a matrix element calculation section 26 as functional blocks functioning when a processing program described later is executed.

First, a calculation method of electron repulsion integral with the maximum number of times multiplication with addition operation is executed when the recursive calculation order is 2, namely, electron repulsion integral [dd, dd] will be discussed. The electron repulsion integral [dd, dd] contains $6^4=1296$ electron repulsion integrals in response to the angular momentum components of basis functions making up the electron repulsion integral [dd, dd], because there are six types of angular momenta with magnitude expressed by d, dxx, dyy, dzz, dyz, dzx, and dxy, and each of the four basis functions of the electron repulsion integral can take the six types of angular momenta. As an example, calculation of the electron repulsion integral [dxxdxx, dxxdxx] with the maximum number of times multiplication with addition operation is executed among the 1296 electron repulsion integrals will be discussed.

As shown in the expressions (11)–(17) mentioned above, electron repulsion integrals of the recursive order 1 or less (auxiliary integrals in some cases) can be easily expanded into recursion formulae and the capacity of the procedure to be stored in the instruction memory 14 does not become enormous. On the other hand, electron repulsion integrals of the recursive order 2, the calculation procedure of which becomes enormous, were substantially unable to be calculated.

Then, in the embodiment, auxiliary integrals of the recursive order 1 or less are provided and the provided data is used to calculate electron repulsion integrals of the recursive order 2 without producing an enormous amount of procedure.

First, the electron repulsion integral [dxxdxx, dxxdxx] of the recursive order 2 is expanded into recursion formulae of the following expressions (21)–(76) not containing auxiliary integrals of the recursive order 1 or less from the above-mentioned expression (9): (Assume that auxiliary integrals of the recursive order 1 or less are provided.)

$$[d_{xx}d_{xx}, d_{xx}d_{xx}]^{(0)} = [p_xd_{xx}, d_{xx}d_{xx}]^{(0)} + [p_xd_{xx}, d_{xx}d_{xx}]^{(1)} + \\ [sd_{xx}, d_{xx}d_{xx}]^{(0)} + [sd_{xx}, d_{xx}d_{xx}]^{(1)} + \\ [p_xp_x, d_{xx}d_{xx}]^{(0)} + [p_xp_x, d_{xx}d_{xx}]^{(1)} + \\ [p_xd_{xx}, p_xd_{xx}]^{(1)} + [p_xd_{xx}, d_{xx}p_x]^{(1)} \quad (21)$$

$$[p_xd_{xx}, d_{xx}d_{xx}]^{(0)} = [p_xp_x, d_{xx}d_{xx}]^{(0)} + [p_xp_x, d_{xx}d_{xx}]^{(1)} + \\ [p_xs, d_{xx}d_{xx}]^{(0)} + [p_xs, d_{xx}d_{xx}]^{(1)} + \\ [sp_x, d_{xx}d_{xx}]^{(0)} + [sp_x, d_{xx}d_{xx}]^{(1)} + \\ [p_xp_x, p_xd_{xx}]^{(1)} + [p_xp_x, d_{xx}p_x]^{(1)} \quad (22)$$

$$[sd_{xx}, d_{xx}d_{xx}]^{(0)} = [sp_x, d_{xx}d_{xx}]^{(0)} + [sp_x, d_{xx}d_{xx}]^{(1)} + \\ [ss, d_{xx}d_{xx}]^{(0)} + [ss, d_{xx}d_{xx}]^{(1)} + \\ [sp_x, p_xd_{xx}]^{(1)} + [sp_x, d_{xx}p_x]^{(1)} \quad (23)$$

$$[sd_{xx}, d_{xx}d_{xx}]^{(1)} = [sp_x, d_{xx}d_{xx}]^{(1)} + [sp_x, d_{xx}d_{xx}]^{(2)} + \\ [ss, d_{xx}d_{xx}]^{(1)} + [ss, d_{xx}d_{xx}]^{(2)} + \\ [sp_x, p_xd_{xx}]^{(2)} + [sp_x, d_{xx}p_x]^{(2)} \quad (24)$$

$$[p_xp_x, d_{xx}d_{xx}]^{(0)} = [p_xp_x, p_xd_{xx}]^{(0)} + [p_xp_x, p_xd_{xx}]^{(1)} + \\ [p_xp_x, sd_{xx}]^{(0)} + [p_xp_x, sd_{xx}]^{(1)} + \\ [p_xp_x, p_xp_x]^{(0)} + [p_xp_x, p_xp_x]^{(1)} + \\ [sp_x, p_xd_{xx}]^{(1)} + [p_xs, p_xd_{xx}]^{(1)} \quad (25)$$

$$[p_xp_x, d_{xx}d_{xx}]^{(1)} = [p_xp_x, p_xd_{xx}]^{(1)} + [p_xp_x, p_xd_{xx}]^{(2)} + \\ [p_xp_x, sd_{xx}]^{(1)} + [p_xp_x, sd_{xx}]^{(2)} + \\ [p_xp_x, p_xp_x]^{(1)} + [p_xp_x, p_xp_x]^{(2)} + \\ [sp_x, p_xd_{xx}]^{(2)} + [p_xs, p_xd_{xx}]^{(2)} \quad (26)$$

$$[p_xd_{xx}, p_xd_{xx}]^{(1)} = [p_xp_x, p_xd_{xx}]^{(1)} + [p_xp_x, p_xd_{xx}]^{(2)} + \\ [p_xs, p_xd_{xx}]^{(1)} + [p_xs, p_xd_{xx}]^{(2)} + \\ [sp_x, p_xd_{xx}]^{(1)} + [sp_x, p_xd_{xx}]^{(2)} + \\ [p_xp_x, sd_{xx}]^{(2)} + [p_xp_x, p_xp_x]^{(2)} \quad (27)$$

$$[p_xd_{xx}, d_{xx}p_x]^{(1)} = [p_xp_x, d_{xx}p_x]^{(1)} + [p_xp_x, d_{xx}p_x]^{(2)} + \\ [p_xs, d_{xx}p_x]^{(1)} + [p_xs, d_{xx}p_x]^{(2)} + \\ [sp_x, d_{xx}p_x]^{(1)} + [sp_x, d_{xx}p_x]^{(2)} + \\ [p_xp_x, p_xp_x]^{(2)} + [p_xp_x, d_{xx}s]^{(2)} \quad (28)$$

$$[p_xp_x, d_{xx}d_{xx}]^{(2)} = [p_xp_x, p_xd_{xx}]^{(2)} + [p_xp_x, p_xd_{xx}]^{(3)} + \\ [p_xp_x, sd_{xx}]^{(2)} + [p_xp_x, sd_{xx}]^{(3)} + \\ [p_xp_x, p_xp_x]^{(2)} + [p_xp_x, p_xp_x]^{(3)} + \\ [sp_x, p_xd_{xx}]^{(3)} + [p_xs, p_xd_{xx}]^{(3)} \quad (29)$$

$$[p_xs, d_{xx}d_{xx}]^{(0)} = [p_xs, p_xd_{xx}]^{(0)} + [p_xs, p_xd_{xx}]^{(1)} + \\ [p_xs, sd_{xx}]^{(0)} + [p_xs, sd_{xx}]^{(1)} + \\ [p_xs, p_xp_x]^{(0)} + [p_xs, p_xp_x]^{(1)} + \\ [ss, p_xd_{xx}]^{(1)} \quad (30)$$

$$[p_xs, d_{xx}d_{xx}]^{(1)} = [p_xs, p_xd_{xx}]^{(1)} + [p_xs, p_xd_{xx}]^{(2)} + \\ [p_xs, sd_{xx}]^{(1)} + [p_xs, sd_{xx}]^{(2)} + \\ [p_xs, p_xp_x]^{(1)} + [p_xs, p_xp_x]^{(2)} + \\ [ss, p_xd_{xx}]^{(2)} \quad (31)$$

$$[p_xs, d_{xx}d_{xx}]^{(2)} = [p_xs, p_xd_{xx}]^{(2)} + [p_xs, p_xd_{xx}]^{(3)} + \\ [p_xs, sd_{xx}]^{(2)} + [p_xs, sd_{xx}]^{(3)} + \\ [p_xs, p_xp_x]^{(2)} + [p_xs, p_xp_x]^{(3)} + \\ [ss, p_xd_{xx}]^{(3)} \quad (32)$$

$$[sp_x, d_{xx}d_{xx}]^{(0)} = [sp_x, p_xd_{xx}]^{(0)} + [sp_x, p_xd_{xx}]^{(1)} + \\ [sp_x, sd_{xx}]^{(0)} + [sp_x, sd_{xx}]^{(1)} + \\ [sp_x, p_xp_x]^{(0)} + [sp_x, p_xp_x]^{(1)} + \\ [ss, p_xd_{xx}]^{(1)} \quad (33)$$

$$[sp_x, d_{xx}d_{xx}]^{(1)} = [sp_x, p_xd_{xx}]^{(1)} + [sp_x, p_xd_{xx}]^{(2)} + \\ [sp_x, sd_{xx}]^{(1)} + [sp_x, sd_{xx}]^{(2)} + \\ [sp_x, p_xp_x]^{(1)} + [sp_x, p_xp_x]^{(2)} + \\ [ss, p_xd_{xx}]^{(2)} \quad (34)$$

$$[sp_x, d_{xx}d_{xx}]^{(2)} = [sp_x, p_xd_{xx}]^{(2)} + [sp_x, p_xd_{xx}]^{(3)} + \\ [sp_x, sd_{xx}]^{(2)} + [sp_x, sd_{xx}]^{(3)} + \\ [sp_x, p_xp_x]^{(2)} + [sp_x, p_xp_x]^{(3)} + \\ [ss, p_xd_{xx}]^{(3)}$$ (35)

$$[p_xp_x, p_xd_{xx}]^{(0)} = [p_xp_x, p_xp_x]^{(0)} + [p_xp_x, p_xp_x]^{(1)} + \\ [p_xp_x, p_xs]^{(0)} + [p_xp_x, p_xs]^{(1)} + \\ [p_xp_x, sp_x]^{(0)} + [p_xp_x, sp_x]^{(1)} + \\ [sp_x, p_xp_x]^{(1)} + [p_xs, p_xp_x]^{(1)}$$ (36)

$$[p_xp_x, p_xd_{xx}]^{(1)} = [p_xp_x, p_xp_x]^{(1)} + [p_xp_x, p_xp_x]^{(2)} + \\ [p_xp_x, p_xs]^{(1)} + [p_xp_x, p_xs]^{(2)} + \\ [p_xp_x, sp_x]^{(1)} + [p_xp_x, sp_x]^{(2)} + \\ [sp_x, p_xp_x]^{(2)} + [p_xs, p_xp_x]^{(2)}$$ (37)

$$[p_xp_x, p_xd_{xx}]^{(2)} = [p_xp_x, p_xp_x]^{(2)} + [p_xp_x, p_xp_x]^{(3)} + \\ [p_xp_x, p_xs]^{(2)} + [p_xp_x, p_xs]^{(3)} + \\ [p_xp_x, sp_x]^{(2)} + [p_xp_x, sp_x]^{(3)} + \\ [sp_x, p_xp_x]^{(3)} + [p_xs, p_xp_x]^{(3)}$$ (38)

$$[p_xp_x, d_{xx}p_x]^{(1)} = [p_xp_x, p_xp_x]^{(1)} + [p_xp_x, p_xp_x]^{(2)} + \\ [p_xp_x, sp_x]^{(1)} + [p_xp_x, sp_x]^{(2)} + \\ [p_xp_x, p_xs]^{(1)} + [p_xp_x, p_xs]^{(2)} + \\ [sp_x, p_xp_x]^{(2)} + [p_xs, p_xp_x]^{(2)}$$ (39)

$$[p_xp_x, d_{xx}p_x]^{(2)} = [p_xp_x, p_xp_x]^{(2)} + [p_xp_x, p_xp_x]^{(3)} + \\ [p_xp_x, sp_x]^{(2)} + [p_xp_x, sp_x]^{(3)} + \\ [p_xp_x, p_xs]^{(2)} + [p_xp_x, p_xs]^{(3)} + \\ [sp_x, p_xp_x]^{(3)} + [p_xs, p_xp_x]^{(3)}$$ (40)

$$[ss, d_{xx}d_{xx}]^{(0)} = [ss, p_xd_{xx}]^{(0)} + [ss, p_xd_{xx}]^{(1)} + \\ [ss, sd_{xx}]^{(0)} + [ss, sd_{xx}]^{(1)} + \\ [ss, p_xp_x]^{(0)} + [ss, p_xp_x]^{(1)}$$ (41)

$$[ss, d_{xx}d_{xx}]^{(1)} = [ss, p_xd_{xx}]^{(1)} + [ss, p_xd_{xx}]^{(2)} + \\ [ss, sd_{xx}]^{(1)} + [ss, sd_{xx}]^{(2)} + \\ [ss, p_xp_x]^{(1)} + [ss, p_xp_x]^{(2)}$$ (42)

$$[ss, d_{xx}d_{xx}]^{(2)} = [ss, p_xd_{xx}]^{(2)} + [ss, p_xd_{xx}]^{(3)} + \\ [ss, sd_{xx}]^{(2)} + [ss, sd_{xx}]^{(3)} + \\ [ss, p_xp_x]^{(2)} + [ss, p_xp_x]^{(3)}$$ (43)

$$[sp_x, p_xd_{xx}]^{(0)} = [sp_x, p_xp_x]^{(0)} + [sp_x, p_xp_x]^{(1)} + \\ [sp_x, p_xs]^{(0)} + [sp_x, p_xs]^{(1)} + \\ [sp_x, sp_x]^{(0)} + [sp_x, sp_x]^{(1)} + \\ [ss, p_xp_x]^{(1)}$$ (44)

$$[sp_x, p_xd_{xx}]^{(1)} = [sp_x, p_xp_x]^{(1)} + [sp_x, p_xp_x]^{(2)} + \\ [sp_x, p_xs]^{(1)} + [sp_x, p_xs]^{(2)} + \\ [sp_x, sp_x]^{(1)} + [sp_x, sp_x]^{(2)} + \\ [ss, p_xp_x]^{(2)}$$ (45)

$$[sp_x, p_xd_{xx}]^{(2)} = [sp_x, p_xp_x]^{(2)} + [sp_x, p_xp_x]^{(3)} + \\ [sp_x, p_xs]^{(2)} + [sp_x, p_xs]^{(3)} + \\ [sp_x, sp_x]^{(2)} + [sp_x, sp_x]^{(3)} + \\ [ss, p_xp_x]^{(3)}$$ (46)

$$[sp_x, p_xd_{xx}]^{(3)} = [sp_x, p_xp_x]^{(3)} + [sp_x, p_xp_x]^{(4)} + \\ [sp_x, p_xs]^{(3)} + [sp_x, p_xs]^{(4)} + \\ [sp_x, sp_x]^{(3)} + [sp_x, sp_x]^{(4)} + \\ [ss, p_xp_x]^{(4)}$$ (47)

$$[sp_x, d_{xx}p_x]^{(1)} = [sp_x, p_xp_x]^{(1)} + [sp_x, p_xp_x]^{(2)} + \\ [sp_x, sp_x]^{(1)} + [sp_x, sp_x]^{(2)} + \\ [sp_x, p_xs]^{(1)} + [sp_x, p_xs]^{(2)} + \\ [ss, p_xp_x]^{(2)}$$ (48)

$$[sp_x, d_{xx}p_x]^{(2)} = [sp_x, p_xp_x]^{(2)} + [sp_x, p_xp_x]^{(3)} + \\ [sp_x, sp_x]^{(2)} + [sp_x, sp_x]^{(3)} + \\ [sp_x, p_xs]^{(2)} + [sp_x, p_xs]^{(3)} + \\ [ss, p_xp_x]^{(3)}$$ (49)

$$[p_xp_x, sd_{xx}]^{(0)} = [p_xp_x, sp_x]^{(0)} + [p_xp_x, sp_x]^{(1)} + \\ [p_xp_x, ss]^{(0)} + [p_xp_x, ss]^{(1)} + \\ [sp_x, sp_x]^{(1)} + [p_xs, sp_x]^{(1)}$$ (50)

$$[p_xp_x, sd_{xx}]^{(1)} = [p_xp_x, sp_x]^{(1)} + [p_xp_x, sp_x]^{(2)} + \\ [p_xp_x, ss]^{(1)} + [p_xp_x, ss]^{(2)} + \\ [sp_x, sp_x]^{(2)} + [p_xs, sp_x]^{(2)}$$ (51)

$$[p_xp_x, sd_{xx}]^{(2)} = [p_xp_x, sp_x]^{(2)} + [p_xp_x, sp_x]^{(3)} + \\ [p_xp_x, ss]^{(2)} + [p_xp_x, ss]^{(3)} + \\ [sp_x, sp_x]^{(3)} + [p_xs, sp_x]^{(3)}$$ (52)

$$[p_xp_x, sd_{xx}]^{(3)} = [p_xp_x, sp_x]^{(3)} + [p_xp_x, sp_x]^{(4)} + \\ [p_xp_x, ss]^{(3)} + [p_xp_x, ss]^{(4)} + \\ [sp_x, sp_x]^{(4)} + [p_xs, sp_x]^{(4)}$$ (53)

$$[p_xs, p_xd_{xx}]^{(0)} = [p_xs, p_xp_x]^{(0)} + [p_xs, p_xp_x]^{(1)} + \\ [p_xs, p_xs]^{(0)} + [p_xs, p_xs]^{(1)} + \\ [p_xs, sp_x]^{(0)} + [p_xs, sp_x]^{(1)} + \\ [ss, p_xp_x]^{(1)}$$ (54)

$$[p_xs, p_xd_{xx}]^{(1)} = [p_xs, p_xp_x]^{(1)} + [p_xs, p_xp_x]^{(2)} + \\ [p_xs, p_xs]^{(1)} + [p_xs, p_xs]^{(2)} + \\ [p_xs, sp_x]^{(1)} + [p_xs, sp_x]^{(2)} + \\ [ss, p_xp_x]^{(2)}$$ (55)

$$[p_xs, p_xd_{xx}]^{(2)} = [p_xs, p_xp_x]^{(2)} + [p_xs, p_xp_x]^{(3)} + \\ [p_xs, p_xs]^{(2)} + [p_xs, p_xs]^{(3)} + \\ [p_xs, sp_x]^{(2)} + [p_xs, sp_x]^{(3)} + \\ [ss, p_xp_x]^{(3)}$$ (56)

$$[p_xs, p_xd_{xx}]^{(3)} = [p_xs, p_xp_x]^{(3)} + [p_xs, p_xp_x]^{(4)} + \\ [p_xs, p_xs]^{(3)} + [p_xs, p_xs]^{(4)} + \\ [p_xs, sp_x]^{(3)} + [p_xs, sp_x]^{(4)} + \\ [ss, p_xp_x]^{(4)}$$ (57)

$$[p_xs, d_{xx}p_x]^{(1)} = [p_xs, p_xp_x]^{(1)} + [p_xs, p_xp_x]^{(2)} + \\ [p_xs, sp_x]^{(1)} + [p_xs, sp_x]^{(2)} + \\ [p_xs, p_xs]^{(1)} + [p_xs, p_xs]^{(2)} + \\ [ss, p_xp_x]^{(2)}$$ (58)

-continued $$[p_x s, d_{xx} p_x]^{(2)} = [p_x s, p_x p_x]^{(2)} + [p_x s, p_x p_x]^{(3)} + \\ [p_x s, sp_x]^{(2)} + [p_x s, sp_x]^{(3)} + \\ [p_x s, p_x s]^{(2)} + [p_x s, p_x s]^{(3)} + \\ [ss, p_x p_x]^{(3)}$$ (59)

$$[p_x p_x, d_{xx} s]^{(2)} = [p_x p_x, p_x s]^{(2)} + [p_x p_x, p_x s]^{(3)} + \\ [p_x p_x, ss]^{(2)} + [p_x p_x, ss]^{(3)} + \\ [sp_x, p_x s]^{(3)} + [p_x s, p_x s]^{(3)}$$ (60)

$$[p_x s, sd_{xx}]^{(0)} = [p_x s, sp_x]^{(0)} + [p_x s, sp_x]^{(1)} + \\ [p_x s, ss]^{(0)} + [p_x s, ss]^{(1)} + \\ [ss, sp_x]^{(1)}$$ (61)

$$[p_x s, sd_{xx}]^{(1)} = [p_x s, sp_x]^{(1)} + [p_x s, sp_x]^{(2)} + \\ [p_x s, ss]^{(1)} + [p_x s, ss]^{(2)} + \\ [ss, sp_x]^{(2)}$$ (62)

$$[p_x s, sd_{xx}]^{(2)} = [p_x s, sp_x]^{(2)} + [p_x s, sp_x]^{(3)} + \\ [p_x s, ss]^{(2)} + [p_x s, ss]^{(3)} + \\ [ss, sp_x]^{(3)}$$ (63)

$$[p_x s, sd_{xx}]^{(3)} = [p_x s, sp_x]^{(3)} + [p_x s, sp_x]^{(4)} + \\ [p_x s, ss]^{(3)} + [p_x s, ss]^{(4)} + \\ [ss, sp_x]^{(4)}$$ (64)

$$[ss, p_x d_{xx}]^{(0)} = [ss, p_x p_x]^{(0)} + [ss, p_x p_x]^{(1)} + \\ [ss, p_x s]^{(0)} + [ss, p_x s]^{(1)} + \\ [ss, sp_x]^{(0)} + [ss, sp_x]^{(1)}$$ (65)

$$[ss, p_x d_{xx}]^{(1)} = [ss, p_x p_x]^{(1)} + [ss, p_x p_x]^{(2)} + \\ [ss, p_x s]^{(1)} + [ss, p_x s]^{(2)} + \\ [ss, sp_x]^{(1)} + [ss, sp_x]^{(2)}$$ (66)

$$[ss, p_x d_{xx}]^{(2)} = [ss, p_x p_x]^{(2)} + [ss, p_x p_x]^{(3)} + \\ [ss, p_x s]^{(2)} + [ss, p_x s]^{(3)} + \\ [ss, sp_x]^{(2)} + [ss, sp_x]^{(3)}$$ (67)

$$[ss, p_x d_{xx}]^{(3)} = [ss, p_x p_x]^{(3)} + [ss, p_x p_x]^{(4)} + \\ [ss, p_x s]^{(3)} + [ss, p_x s]^{(4)} + \\ [ss, sp_x]^{(3)} + [ss, sp_x]^{(4)}$$ (68)

$$[sp_x, sd_{xx}]^{(0)} = [sp_x, sp_x]^{(0)} + [sp_x, sp_x]^{(1)} + \\ [sp_x, ss]^{(0)} + [sp_x, ss]^{(1)} + \\ [ss, sp_x]^{(1)}$$ (69)

$$[sp_x, sd_{xx}]^{(1)} = [sp_x, sp_x]^{(1)} + [sp_x, sp_x]^{(2)} + \\ [sp_x, ss]^{(1)} + [sp_x, ss]^{(2)} + \\ [ss, sp_x]^{(2)}$$ (70)

$$[sp_x, sd_{xx}]^{(2)} = [sp_x, sp_x]^{(2)} + [sp_x, sp_x]^{(3)} + \\ [sp_x, ss]^{(2)} + [sp_x, ss]^{(3)} + \\ [ss, sp_x]^{(3)}$$ (71)

$$[sp_x, sd_{xx}]^{(3)} = [sp_x, sp_x]^{(3)} + [sp_x, sp_x]^{(4)} + \\ [sp_x, ss]^{(3)} + [sp_x, ss]^{(4)} + \\ [ss, sp_x]^{(4)}$$ (72)

$$[ss, sd_{xx}]^{(0)} = [ss, sp_x]^{(0)} + [ss, sp_x]^{(1)} + \\ [ss, ss]^{(0)} + [ss, ss]^{(1)}$$ (73)

$$[ss, sd_{xx}]^{(1)} = [ss, sp_x]^{(1)} + [ss, sp_x]^{(2)} + \\ [ss, ss]^{(1)} + [ss, ss]^{(2)}$$ (74)

$$[ss, sd_{xx}]^{(2)} = [ss, sp_x]^{(2)} + [ss, sp_x]^{(3)} + \\ [ss, ss]^{(2)} + [ss, ss]^{(3)}$$ (75)

$$[ss, sd_{xx}]^{(3)} = [ss, sp_x]^{(3)} + [ss, sp_x]^{(4)} + \\ [ss, ss]^{(3)} + [ss, ss]^{(4)}$$ (76)

In the expressions, coefficients by which the auxiliary integrals are to be multiplied are not described, but multiplication is required in each auxiliary integral term and the number of necessary multiplication with addition operations is the same as the number of auxiliary integral terms appearing on the right-hand sides of the expressions, 362. The capacity of the instruction memory 14 required for storing the multiplication with addition operation procedure is about 2.9K bytes; it is reduced to about 1/100 as compared with the conventional procedure requiring 270K bytes.

As seen from the expressions (21) to (76), the auxiliary integrals of the recursive order 1 or less such as auxiliary integrals [pxpx, pxpx]$^{(0)}$, [pxpx, pxpx]$^{(1)}$, [pxs, pxs]$^{(1)}$, and [ss, ss]$^{(2)}$ with provided numeric values can be used to obtain the numeric value of the electron repulsion integral [dxxdxx, dxxdxx]. Considering the angular momenta of the basis functions, it is assumed that each of the four basis functions can take the four types of S, px, py, and pz, thus $4^4$=256 and the auxiliary index changes from 0 to 4, thus 256×5=1280 auxiliary integrals are to be provided as a whole. In this case, the required capacity of the data memory 15 is about 10K bytes if each auxiliary integral is expressed in double precision.

Next, a method of calculating electron repulsion integrals of the recursive calculation order 2 and finding Fock matrix element F'Rs will be discussed. First, when receiving basis index R, the classification section 22 in the control circuit 21 classifies the electron repulsion integrals in response to combination of atomic nucleus coordinates and orbital exponent.

Next, the coefficient calculation section 23 in the control circuit 21 generates coefficients required for product sum calculation according to a program stored in the program memory 12 and stores the coefficients in the data memory 15.

Next, the small product sum procedure calculation section 24 in the control circuit 21 generates a product sum calculation procedure to auxiliary integrals [pp, pp]$^{(m)}$, stores the procedure in the instruction memory 14, and outputs a multiplication with addition operation start instruction to the multiplication with addition operation circuit 16 for causing the multiplication with addition operation circuit 16 to calculate the auxiliary integrals to the auxiliary integrals [pp, pp]$^{(m)}$.

Next, the large product sum procedure calculation section 25 in the control circuit 21 selects one from among the electron repulsion integrals in the classified electron repulsion integral type, stores density matrix elements Ptu and Psu stored in the large-capacity storage unit 3 in the data memory 15, and generates a multiplication with addition operation procedure to calculate the target electron repulsion integral, then replaces the current multiplication with addition operation procedure in the instruction memory 14 with the new generated multiplication with addition operation procedure. After this, the large product sum procedure calculation section 25 outputs a multiplication with addition operation start instruction to the multiplication with addition operation circuit 16 for causing the multiplication with addition operation circuit 16 to perform multiplication with addition operation while reading necessary data from the data memory 15 in accordance with the new multiplication with addition operation procedure written in the instruction memory and store the computation result in the data memory 15.

Next, upon completion of calculation of one electron repulsion integral gRstu, the matrix element calculation section 26 in the control circuit 21 updates the values of Fock matrix elements F'Rs and F'Rt and calculates F'Rs (s=1–N) until termination of calculation of electron repulsion integrals contained in the electron repulsion integral type according to classification with atomic nucleus coordinates and orbital exponent and calculation for all basis functions s, t, and u.

Figure 4:
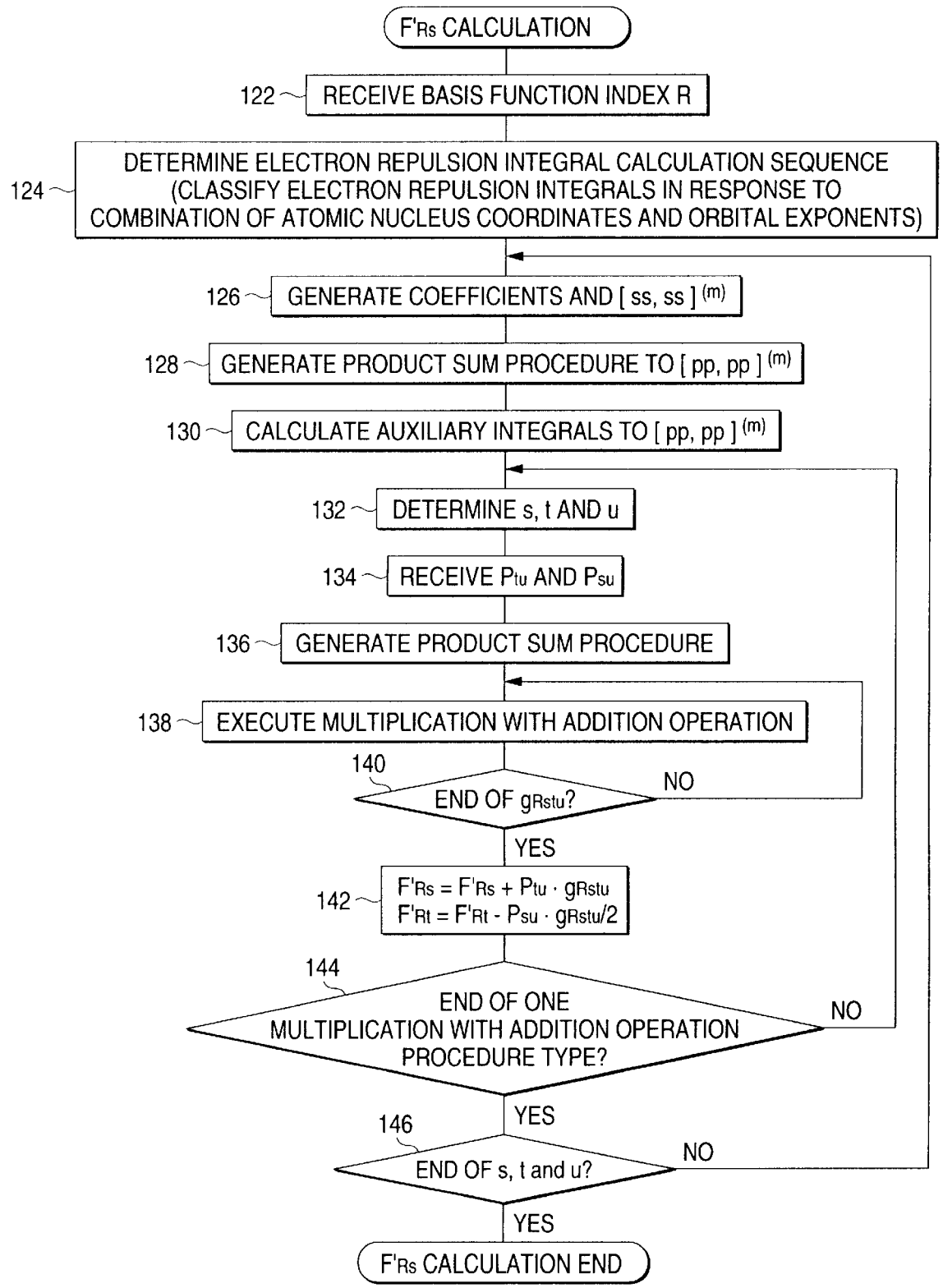
FIG. 4 is a flowchart to show a calculation flow of Fock matrix element by calculating electron repulsion integrals according to a first embodiment of the invention.

More particularly, when receiving basis index R at step 122 in FIG. 4, the control circuit 21 classifies electron repulsion integrals in response to combination of atomic nucleus coordinates and orbital exponent at step 124, because provided coefficients and 1280 auxiliary integrals can be used in common for the electron repulsion integrals matching in atomic nucleus coordinates and orbital exponents of basis functions s, t, and u and the electron repulsion integrals can be consecutively calculated for efficient calculation. The steps 122 and 123 are equivalent to the process of the classification section 22 contained in the control circuit 21.

Next, at step 126, the control circuit 21 generates coefficients required for product sum calculation according to a program stored in the program memory 12 and stores the coefficients in the data memory 15. At the step, the control circuit 21 also calculates auxiliary integrals $[ss, ss]^{(0)}$ to $[ss, ss]^{(8)}$ and stores them in the data memory 15. The step 126 is equivalent to the process of the coefficient calculation section 23 in the control circuit 21.

At step 128, the control circuit 21 generates a product sum calculation procedure to auxiliary integrals $[pp, pp]^{(m)}$. That is, the control circuit 21 generates a product sum calculation procedure to calculate auxiliary integrals $[ps, ss]^{(m)}$, $[sp, ss]^{(m)}$, $[ss, ps]^{(m)}$, $[ss, sp]^{(m)}$ (m=0–7) and stores the procedure in the instruction memory 14. Likewise, it generates a product sum calculation procedure to calculate auxiliary integrals (m=0–6) with two of four basis functions having angular momentum s and two having angular momentum p and stores the procedure in the instruction memory 14. Likewise, it generates a product sum calculation procedure to calculate auxiliary integrals (m=0–5) with one of four basis functions having angular momentum s and three having angular momentum p and auxiliary integrals $[pp, pp]^{(m)}$ (m=0–4) with four basis functions having angular momentum p and stores the procedure in the instruction memory 14.

At step 130, the control circuit 21 outputs a multiplication with addition operation start instruction to the multiplication with addition operation circuit 16 for calculating the auxiliary integrals to the auxiliary integrals $[pp, pp]^{(m)}$. That is, the multiplication with addition operation circuit 16 calculates the auxiliary integrals according to the generated procedure and stores the results in the data memory 15. Since the calculated auxiliary integrals with the auxiliary index 5 or more are not used for the subsequent processing, the data memory area for them may be released.

The steps 128 and 130 are equivalent to the process of the small product sum procedure calculation section 24 contained in the control circuit 21.

Next, at step 132, one is selected from among the electron repulsion integrals in the classified electron repulsion integral type according to the atomic nucleus coordinates and orbital exponents. That is, the s, t, and u basis functions of the electron repulsion integral to be calculated are determined.

Next, at step 134, density matrix elements Ptu and Psu are loaded from the large-capacity storage unit 3 and are stored into the data memory 15. They are numeric values required to calculate Fock matrix element F'Rs according to expression (18) when the numeric value of electron repulsion integral gRstu is obtained. Thus, when calculation of the electron repulsion integral is started, the control circuit 13 may request the large-capacity storage unit 3 to send the data for reception of the data in the processor unit by the time the calculation of the electron repulsion integral is complete.

At step 136, the control circuit 21 generates a multiplication with addition operation procedure to calculate the target electron repulsion integral. Here, the multiplication with addition operation procedure used for calculating the auxiliary integrals to the auxiliary integrals $[pp, pp]^{(m)}$ (m=0–4) is not necessary and thus is replaced in the instruction memory 14 with the new generated multiplication with addition operation procedure. As described above, the generated multiplication with addition operation procedure need not all be related to recursion formulas until expressed by the auxiliary integrals $[ss, ss]^{(m)}$ and may be related until the angular momenta of the four basis functions contained in auxiliary integral become 1 or less, because all the numeric values of the auxiliary integrals with the four basis functions having the angular momentum 1 or less required for calculation of the electron repulsion integral are already stored in the data memory 15 and need only to be referenced when multiplication with addition operation is executed.

At the termination of the process, at step 138, the control circuit 21 outputs a multiplication with addition operation start instruction to the multiplication with addition operation circuit 16. Upon reception of the start instruction, the multiplication with addition operation circuit 16 performs multiplication with addition operation while reading necessary data from the data memory 15 in accordance with the new multiplication with addition operation procedure written in the instruction memory 14 and stores the computation result in the data memory 15.

The steps 132 to 138 are equivalent to the process of the large product sum procedure calculation section 25 contained in the control circuit 21.

At step 140, whether or not electron repulsion integral calculation is complete is determined. Step 138 is repeated until completion of electron repulsion integral calculation. That is, upon completion of the multiplication with addition operation procedure written in the instruction memory 14, yes is returned at step 140, indicating that the calculation of one electron repulsion integral gRstu is complete. Upon completion of the calculation of one electron repulsion integral gRstu, the control circuit 21 uses the multiplication with addition operation circuit 16 to update the values of Fock matrix elements F'Rs and F'Rt at step 142.

At step 144, whether or not calculation of all electron repulsion integrals of the type according to classification with atomic nucleus coordinates and orbital exponents is complete is determined. If a electron repulsion integral not yet calculated is contained in the electron repulsion integral type according to the classification with atomic nucleus coordinates and orbital exponents, no is returned at step 144 and without updating the coefficients or auxiliary integrals stored in the data memory 15, control returns to step 132 at which s, t, and u are changed for calculating the electron repulsion integral not yet calculated. On the other hand, if calculation of the electron repulsion integrals contained in the electron repulsion integral type according to classification with atomic nucleus coordinates and orbital exponents is complete, yes is returned at step 144 and control goes to step 146 at which whether or not calculation for all basis functions s, t, and u is complete is determined. If it is determined at step 146 that the calculation is not complete, control returns to step 126 at which coefficients and auxiliary integrals corresponding to the electron repulsion integral type according to another classification with atomic nucleus coordinates and orbital exponents are generated and the subsequent steps are repeated. Upon completion of calculation for all s, t, and u basis functions, yes is returned at step 146 and calculation of F'Rs (s=1–N) is now complete.

The steps 140 to 146 are equivalent to the process of the matrix element calculation section 26 in the control circuit 21.

Thus, in the embodiment, data of electron repulsion integrals of small recursive order is provided, then the data is used and a multiplication with addition operation procedure of electron repulsion integrals of large recursive order omitting a multiplication with addition operation procedure of electron repulsion integrals of small recursive order is generated for performing multiplication with addition operation of electron repulsion integrals of large recursive order. Therefore, if the recursive calculation order is large (for example, 2) and multiplication with addition operation procedure becomes enormous, it is not necessary to increase the capacity of the instruction memory 14 as compared with the case where the recursive calculation order is 1. Thus, the processor unit can be easily put into one chip and it is made possible to speed up molecular orbital calculation containing electron repulsion integrals with large recursive calculation order.

In the embodiment, to calculate electron repulsion integrals of recursive order 2, auxiliary integrals of recursive order 1 or less are provided and the electron repulsion integrals of recursive order 2 are calculated. However, the invention is not limited to the recursive order 2 and can also be applied to calculation of electron repulsion integrals of recursive order 3 or more. To calculate the electron repulsion integrals of recursive order 3 or more, finally auxiliary integrals of recursive order 1 or less are used. Therefore, the order may be increased like 2-auxiliary integrals of recursive order 1 or less, auxiliary integrals of recursive order 2, . . . for calculation.

To perform multiplication with addition operation on electron repulsion integrals, its multiplication with addition operation procedure is stored in the instruction memory; the instruction memory has a predetermined capacity. Thus, calculation to the multiplication with addition operation procedure of the size meeting the capacity of the instruction memory may be repeated without limiting according to the order of the electron repulsion integrals on which multiplication with addition operation is performed.

The case where the order of the electron repulsion integrals provided is 2 has been discussed. However, the capacity of the instruction memory may be considered for setting the order of the electron repulsion integrals provided. In this case, it is estimated that the processor units execute different electron repulsion integrals, thus preferably the order of the electron repulsion integrals provided is set for each processor unit. It may be preset by the host or may be calculated based on the value entered by the user.

Second embodiment

A second embodiment of the invention is to process a plurality of recursive calculations different in order. Parts identical with or similar to those previously described in the first embodiment are denoted by the same reference numerals in the second embodiment and will not be discussed in detail again.

In the description of the embodiment, ab initio molecular orbital calculation for assigning calculation of all electron repulsion integrals with r of electron repulsion integral grstu fixed to R to one processor unit is taken as an example. If the angular momentum of basis function R is 2, the order of recursive calculation executed by the processor unit always becomes 2. If the angular momentum of basis function R is 0 or 1, the order of recursive calculation to be executed becomes 0 or 1 if angular momentum magnitudes of basis functions s, t, and u are all 1 or less; the order of recursive calculation to be executed becomes 2 if at least one of basis functions s, t, and u has angular momentum magnitude 2.

Next, a method of calculating electron repulsion integrals by executing a plurality of recursive calculations different in order for finding Fock matrix element F'Rs will be discussed with reference to FIG. 5.

First, when receiving basic function index R from a host computer 1 at step 150, a control circuit 21 classifies the electron repulsion integrals to be calculated into the electron repulsion integrals with basis functions R, s, t, and u having angular momentum 1 or less, which will be hereinafter referred to as first process group, and those with at least one of basis functions R, s, t, and u having angular momentum 2, which will be hereinafter referred to as second process group.

In the embodiment, the electron repulsion integrals are classified into those with angular momentum 1 or less and other electron repulsion integrals, but the invention is not limited to it. They may be classified into those of the order of electron repulsion integrals containing a multiplication with addition operation procedure of the size meeting the capacity of an instruction memory and other electron repulsion integrals, whereby the instruction memory can be used efficiently.

Next, at step 154, calculation of the first process group is started and at step 156, the control circuit 21 classifies calculation sequences of electron repulsion integrals to be calculated according to the electron repulsion integral type in response to angular momentum combination and determines the calculation type sequence.

The steps 150 to 156 are equivalent to a part of the process of a classification section 22 of the control circuit 21 in the embodiment. That is, the classification section 22 in the embodiment classifies the electron repulsion integrals into process groups and classifies the electron repulsion integrals in response to angular momentum combination.

At step 158, the control circuit 21 generates a multiplication with addition operation procedure to obtain the numeric values of the electron repulsion integrals according to the determined sequence and stores the generated multiplication with addition operation procedure in the instruction memory 14.

Next, at step 160, electron repulsion integral gRstu is selected from among the electron repulsion integrals in the product sum calculation procedure type classified at step 156. This is equivalent to determining of s, t, and u because R is fixed.

At step 162, density matrix elements Ptu and Psu are loaded from a large-capacity storage unit 3 and stored into a data memory 15. The density matrix elements Ptu and Psu are numeric values required to calculate Fock matrix element F'Rs according to expression (18) when the numeric value of the electron repulsion integral gRstu is obtained. Thus, when calculation of the electron repulsion integral is started, the control circuit 21 may request the large-capacity storage unit 3 to transmit the data for reception of the data in the processor unit by the time the calculation of the electron repulsion integral is complete.

At step 164, the control circuit 21 generates coefficients and numeric values of auxiliary integrals $[ss, ss]^{(m)}$ used for the multiplication with addition operation based on the basis function R, s, t, u information stored in the data memory 15 and stores them in the data memory 15. Here, a multiplication with addition operation circuit may be used as required.

The steps 158 to 164 are equivalent to a part of the process of a coefficient calculation section 23 in the control circuit 21 in the embodiment.

Upon completion of the steps, at step 166, the control circuit 21 outputs a multiplication with addition operation start instruction to the multiplication with addition operation circuit 16. When receiving the start instruction, the multiplication with addition operation circuit 16 performs multiplication with addition operation while reading necessary data from the data memory 15 according to the multiplication with addition operation procedure written in the instruction memory 14, and stores the computation result in the data memory 15. In the embodiment, a small product sum procedure calculation section 24 in the control circuit 21 can be put in charge of the step 166.

At step 168, whether or not calculation of the electron repulsion integral is complete is determined. If execution of the multiplication with addition operation procedure written in the instruction memory 14 is complete, yes is returned at step 168 and the calculation of one electron repulsion integral gRstu is complete. Upon completion of the calculation of one electron repulsion integral gRstu, the control circuit 21 uses the multiplication with addition operation circuit 16 to update the values of F'Rs and F'Rt at step 170.

At step 172, whether or not calculation of all electron repulsion integrals of the type is complete is determined. If a electron repulsion integral not yet calculated is contained in one multiplication with addition operation procedure type, no is returned at step 172 and control returns to step 160 at which s, t, and u are changed for calculating the electron repulsion integral not yet calculated without updating the multiplication with addition operation procedure stored in the instruction memory 14. On the other hand, if the electron repulsion integrals contained in one multiplication with addition operation procedure type have been calculated, yes is returned at step 172 and control goes to step 174 at which whether or not calculation of the electron repulsion integrals contained in the first process group is complete is determined. If it is not complete, control returns to step 158 at which another type of multiplication with addition operation procedure is generated.

The steps 168 to 174 are equivalent to a part of the process of a matrix element calculation section 26 in the control circuit 21 in the embodiment.

It is determined at step 174 that processing of the first process group is complete, control goes to step 176 and processing of the second process group is started.

First, the control circuit 21 classifies electron repulsion integrals in response to combination of atomic nucleus coordinates and orbital exponent at step 124 and generates coefficients required for product sum calculation according to a program stored in a program memory 12 and stores the coefficients in the data memory 15 at step 126. At the step, the control circuit 21 also calculates auxiliary integrals $[ss, ss]^{(0)}$ to $[ss, ss]^{(8)}$ and stores them in the data memory 15.

The steps 176 and 124 are equivalent to a part of the process of the classification section 22 in the control circuit 21 and step 126 is equivalent to a part of the process of the coefficient calculation section 23 in the control circuit 21.

Next, the control circuit 21 generates a product sum calculation procedure to auxiliary integrals $[pp, pp](m)$ at step 128. The control circuit 21 outputs a multiplication with addition operation start instruction to the multiplication with addition operation circuit 16 for causing the multiplication with addition operation circuit 16 to calculate the auxiliary integrals to the auxiliary integrals $[pp, pp]^{(m)}$ and store the results in the data memory 15 at step 130. The steps 128 and 130 are equivalent to a part of the process of the small product sum procedure calculation section 24 contained in the control circuit 21.

Next, one is selected from among the electron repulsion integrals in the classified electron repulsion integral type according to the atomic nucleus coordinates and orbital exponents by determining s, t, and u of the electron repulsion integral at step 132 and density matrix elements Ptu and Psu are loaded from the large-capacity storage unit 3 into the data memory 15 at step 134.

Next, the control circuit 21 generates a multiplication with addition operation procedure to calculate the target electron repulsion integral and replaces the multiplication with addition operation procedure in the instruction memory 14 with the new generated multiplication with addition operation procedure at step 136.

At the termination of the process, the control circuit 21 outputs a multiplication with addition operation start instruction to the multiplication with addition operation circuit 16 for causing the multiplication with addition operation circuit 16 to performs multiplication with addition operation while reading necessary data from the data memory 15 in accordance with the new multiplication with addition operation procedure written in the instruction memory 14 and store the computation result in the data memory 15 at step 138. The steps 132 to 138 are equivalent to the process of a large product sum procedure calculation section 25 contained in the control circuit 21. If it is determined at step 140 that the multiplication with addition operation procedure written in the instruction memory 14 is complete, it means that the calculation of one electron repulsion integral gRstu is complete. The control circuit 21 uses the multiplication with addition operation circuit 16 to update the values of Fock matrix elements F'Rs and F'Rt at step 142.

If it is determined at step 144 that a electron repulsion integral not yet calculated is contained in the electron repulsion integral type according to the classification with atomic nucleus coordinates and orbital exponents, control returns to step 132 at which s, t, and u are changed for calculating the electron repulsion integral not yet calculated. If it is determined at step 144 that calculation of the electron repulsion integrals contained in the electron repulsion integral type is complete, control goes to step 180 at which whether or not calculation for all s, t, and u is complete is determined, whereby processing of the second group is complete is determined. If it is determined at step 180 that processing of the second group is not complete, control returns to step 126 at which coefficients and auxiliary integrals corresponding to the electron repulsion integral type according to another classification with atomic nucleus coordinates and orbital exponents are generated and the subsequent steps are repeated. Upon completion of calculation for all s, t, and u, it is determined at step 180 that processing of the second group is complete, and calculation of F'Rs (s=1–N) is now complete.

The steps 140 to 144 and 180 are equivalent to a part of the process of a matrix element calculation section 26 in the control circuit 21.

In the embodiment, processing of the second process group is performed after the termination of processing of the second process group, but the sequence may be reversed.

Mention is made here of the capacity required for the instruction memory 14. At the processing time of the first process group, the capacity of the instruction memory 14 may be 5K bytes at the maximum as described in the Background of the invention, because the recursive computation order of the electron repulsion integrals contained in the first process group is 1 or less. At the processing time of the second process group, the capacity of the instruction memory 14 needs to be about 2.9K bytes as described above. In this case, the information for the first process group need not be saved and the instruction memory contents used at the processing time of the first process group can be updated for use, thus the 5K-byte instruction memory needs only to be provided. An SRAM having a capacity of about 5K bytes can be integrated into a single chip containing a multiplication with addition operation unit in the state of art. That is, in the embodiment, the processing method is changed in accordance with the recursive calculation order magnitude, so that large-scale multiplication with addition operation processing can be performed without lowering the processing speed of multiplication with addition operation.

The embodiment provides a system comprising a plurality of processor units and the processor units can also communicate with each other. By the way, the amount in which a multiplication with addition operation procedure can be stored is determined by the capacity of the instruction memory, thus electron repulsion integrals that can be calculated at a time are determined. However, electron repulsion integrals of small order once calculated may be able to be used for electron repulsion integrals of larger order. Thus, if data is transferred between the processor units, electron repulsion integrals of small order once calculated can be used by another processor unit and molecular orbital calculation can be speeded up regardless of the recursive calculation amount. If the processor units differ in instruction memory capacity, calculation matching the capacity of each processor unit can be executed.

In the embodiment, the case where the recursive order is 2 or less, namely, the angular momentum of the electrons of the molecule to which molecular orbital calculation is applied is 2 or less has been discussed. However, a similar technique can also be applied to the case where the recursive order is 3 or more, namely, the angular momentum of the electrons is 3 or more. The invention is not limited to the molecular orbital calculation; if complicated, large-scale recursive calculation is required, the technique of the embodiment can also be used to execute efficient calculation.

Third embodiment

In the second embodiment, electron repulsion integrals are classified into those of recursive order 1 or less (auxiliary integrals) and other electron repulsion integrals. However, the multiplication with addition operation procedure for performing multiplication with addition operation on the electron repulsion integrals to be calculated does not necessarily increase with the recursive order. That is, the multiplication with addition operation procedure may lessen although the recursive order is large.

Then, in a third embodiment of the invention, electron repulsion integrals are classified in response to the size of the multiplication with addition operation procedure that can be stored in an instruction memory (computation amount). Parts identical with or similar to those previously described in the first and second embodiments are denoted by the same reference numerals in the third embodiment and will not be discussed in detail again.

Figure 5:
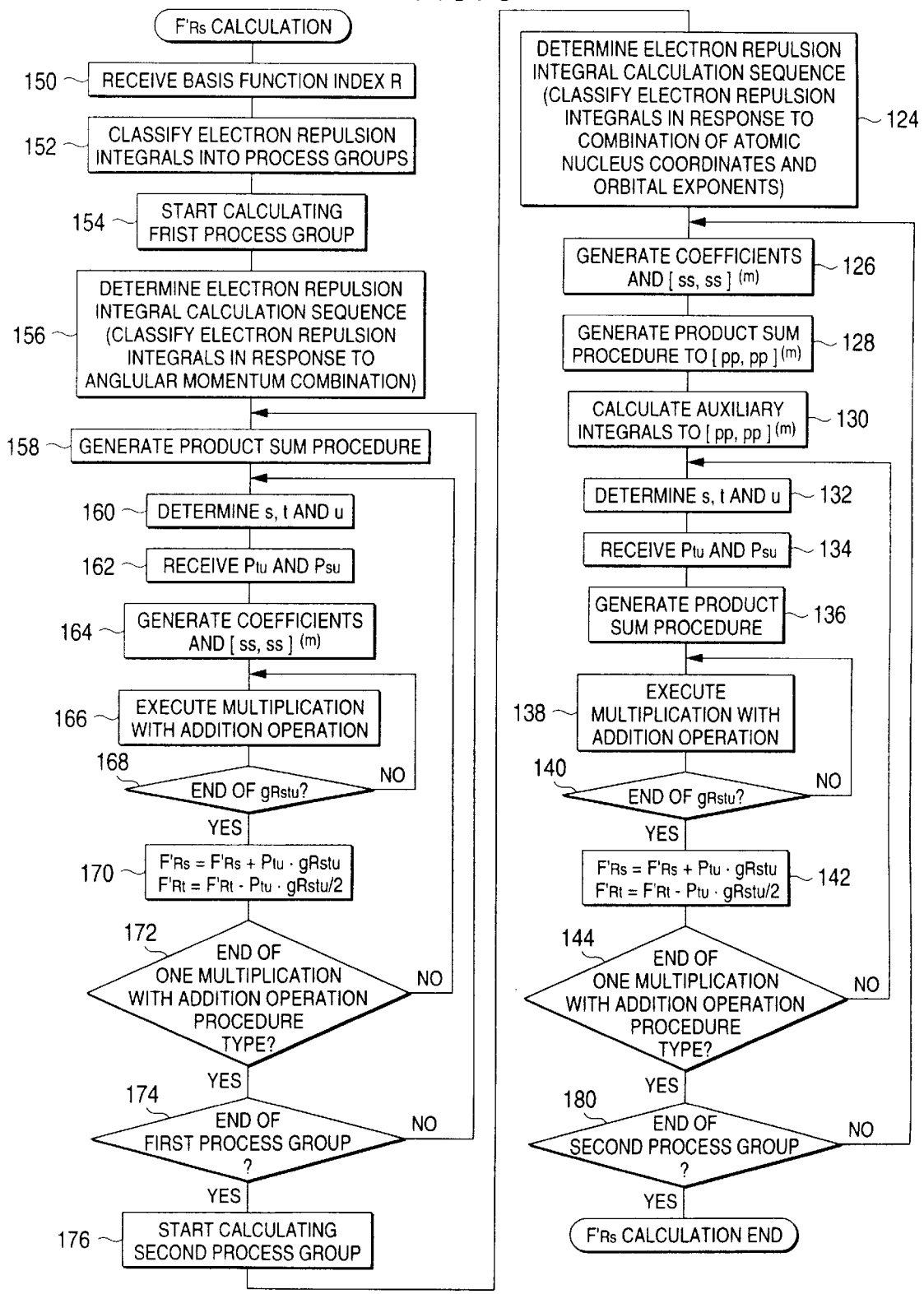
FIG. 5 is a flowchart to show a calculation flow of Fock matrix element by calculating electron repulsion integrals according to a second embodiment of the invention.
Figure 6:
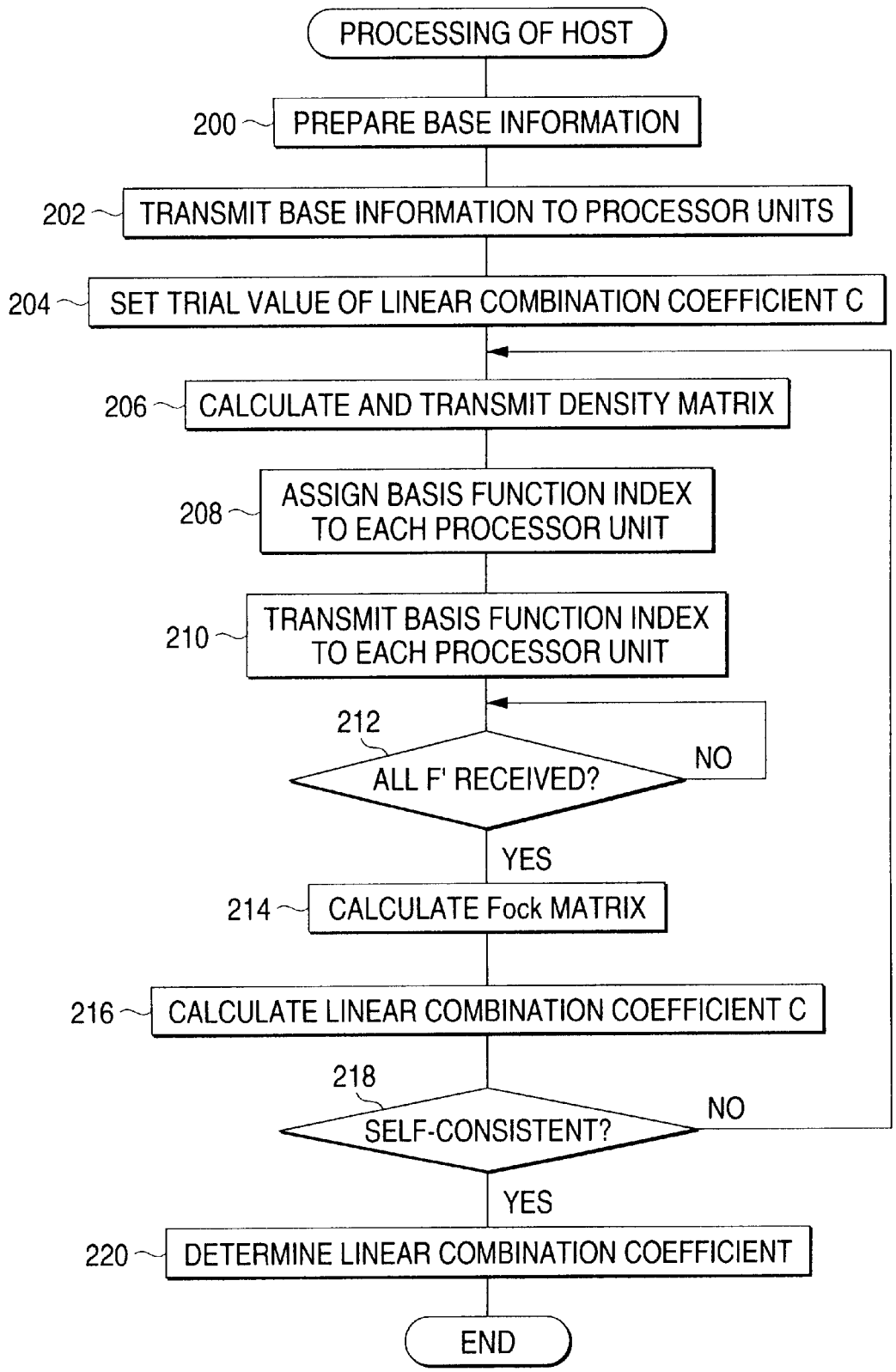
FIG. 6 is a flowchart to show a molecular orbital calculation flow.
Figure 7:
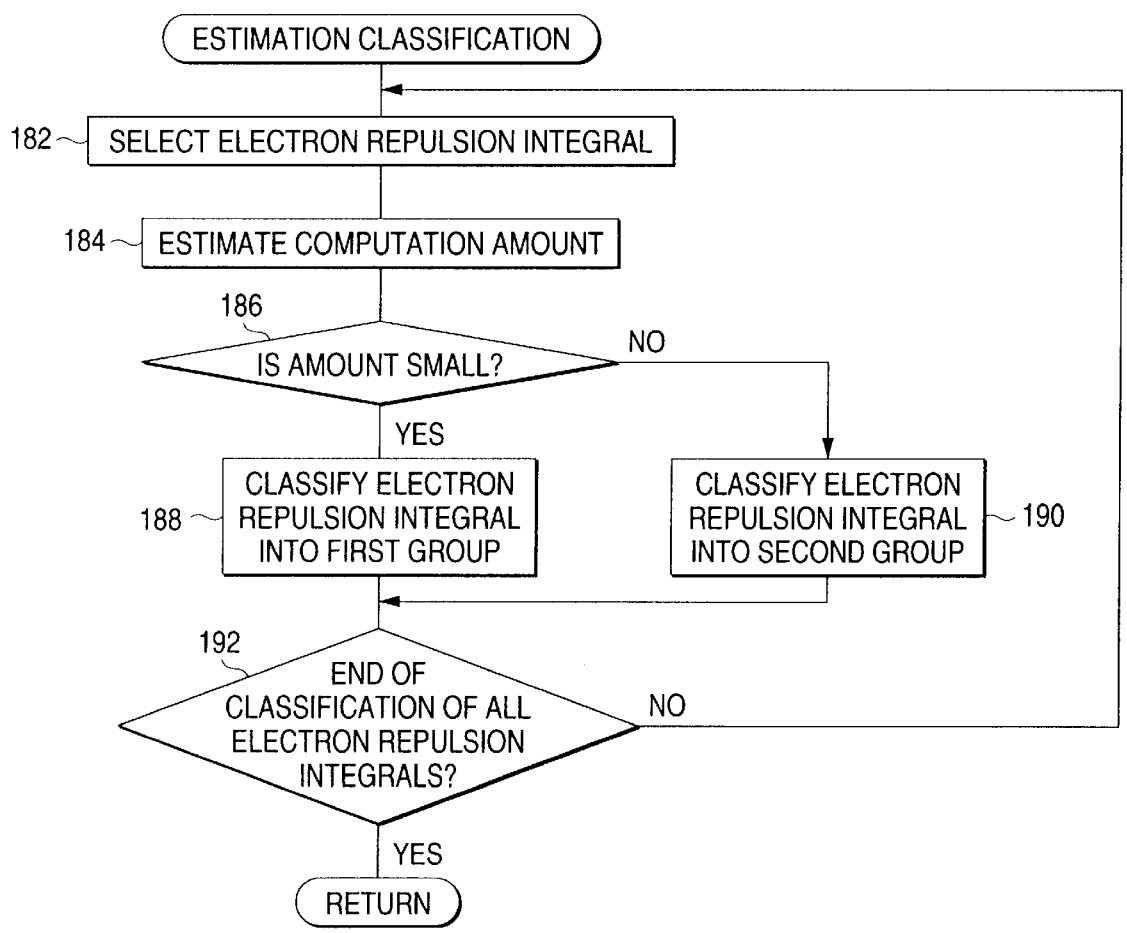
FIG. 7 is a flowchart to show a process flow of classifying electron repulsion integrals according to estimated size according to a third embodiment of the invention.

In the embodiment, in the process of finding the Fock matrix element F'Rs by calculating electron repulsion integrals in FIG. 5, a control circuit 21 classifies the electron repulsion integrals according to the size of the multiplication with addition operation procedure that can be stored in an instruction memory (computation amount). That is, when basis function index R is received from a host computer 1 at step 150 in FIG. 5, an estimation classification routine in FIG. 7 is executed in place of step 152 in FIG. 5.

At step 182, one is selected from among the electron repulsion integrals to be calculated and at step 184, the operation amount of the selected electron repulsion integral, namely, the number of times multiplication with addition operation is to be executed is estimated. At step 186, whether or not the estimated computation amount can be stored in the instruction memory is determined to determine whether or not the computation amount is small. If it is determined at step 186 that the estimated computation amount can be stored, control goes to step 188 at which the selected electron repulsion integral is classified into a first process group and control goes to step 192. If it is determined at step 186 that the estimated computation amount cannot be stored, control goes to step 190 at which the selected electron repulsion integral is classified into a second process group and control goes to step 192. At step 192, whether or not classification of all electron repulsion integrals is complete is determined. If an unclassified electron repulsion integral remains, control returns to step 182 and the process is repeated. On the other hand, it is determined at step 192 that classification of all electron repulsion integrals is complete, control exits from the routine to step 154 in FIG. 5.

Since the electron repulsion integrals are thus classified according to the size of the multiplication with addition operation procedure that can be stored in the instruction memory (computation amount) in the embodiment, the multiplication with addition operation procedure for electron repulsion integrals independent of the angular momentum magnitude is stored in the instruction memory and the instruction memory can be used efficiently.

Fourth embodiment

A fourth embodiment of the invention provides a specific example of classifying electron repulsion integrals in response to the size of the multiplication with addition operation procedure that can be stored in an instruction memory (computation amount) described in the third embodiment. Parts identical with or similar to those previously described in the third embodiment are denoted by the same reference numerals in the fourth embodiment and will not be discussed in detail again. In the embodiment, electron repulsion integral [dxxs, ss] will be discussed as an example. The electron repulsion integral [dxxs, ss] can be expanded into the following expression (77) using expression (9):

$$[d_{xx}s,ss]=[p_xs,ss]^{(0)}+[p_xs,ss]^{(1)}+[ss,ss]^{(0)}+[ss,ss]^{(1)} \qquad (77)$$

As with the recursion formula expansion of expressions (21) to (76) described above, coefficient description of auxiliary integrals is omitted. The expression (77) can be furthermore expanded using expression (17). Therefore, the number of multiplication with addition operations required to obtain the numeric value of electron repulsion integral [dxxs, ss] starting calculation at auxiliary integral [ss, ss]$^{(m)}$, namely, the number of multiplication with addition operation procedures is only eight.

If such the electron repulsion integral requiring a small number of multiplication with addition operation procedures is classified into a second process group, calculation of a large amount of auxiliary integrals not used occupies most of the calculation time, extremely worsening the calculation efficiency. Then, when the maximum one of the angular momenta of four basis functions of a electron repulsion integral is d orbit, if whether or not the multiplication with addition operation procedure to calculate the electron repulsion integral starting at auxiliary integral [ss, ss]$^{(m)}$ is of the size equal to or less than the storage capacity of an instruction memory is determined in response to the magnitude of the angular momenta of other three basis functions and the electron repulsion integral is classified in response to the determination result, the problem can be solved.

Specifically, whether or not the number of multiplication with addition operation procedures to calculate the electron repulsion integral is the size equal to or less than the storage capacity of the instruction memory in response to combination of the number of d orbits, that of p orbits, and that of s orbits in the angular momenta of the four basis functions constituting the electron repulsion integral (orbital pattern) can be known when the instruction memory capacity is determined, namely, when the corresponding processor unit is designed. In fact, even the electron repulsion integrals with the same orbital pattern may differ in the number of multiplication with addition operation procedures. In this case, the maximum multiplication with addition operation procedure in the orbital pattern is used as the reference. Such examination is previously made and each electron repulsion integral is classified into the first or second process group only from the orbital pattern.

Figure 8:
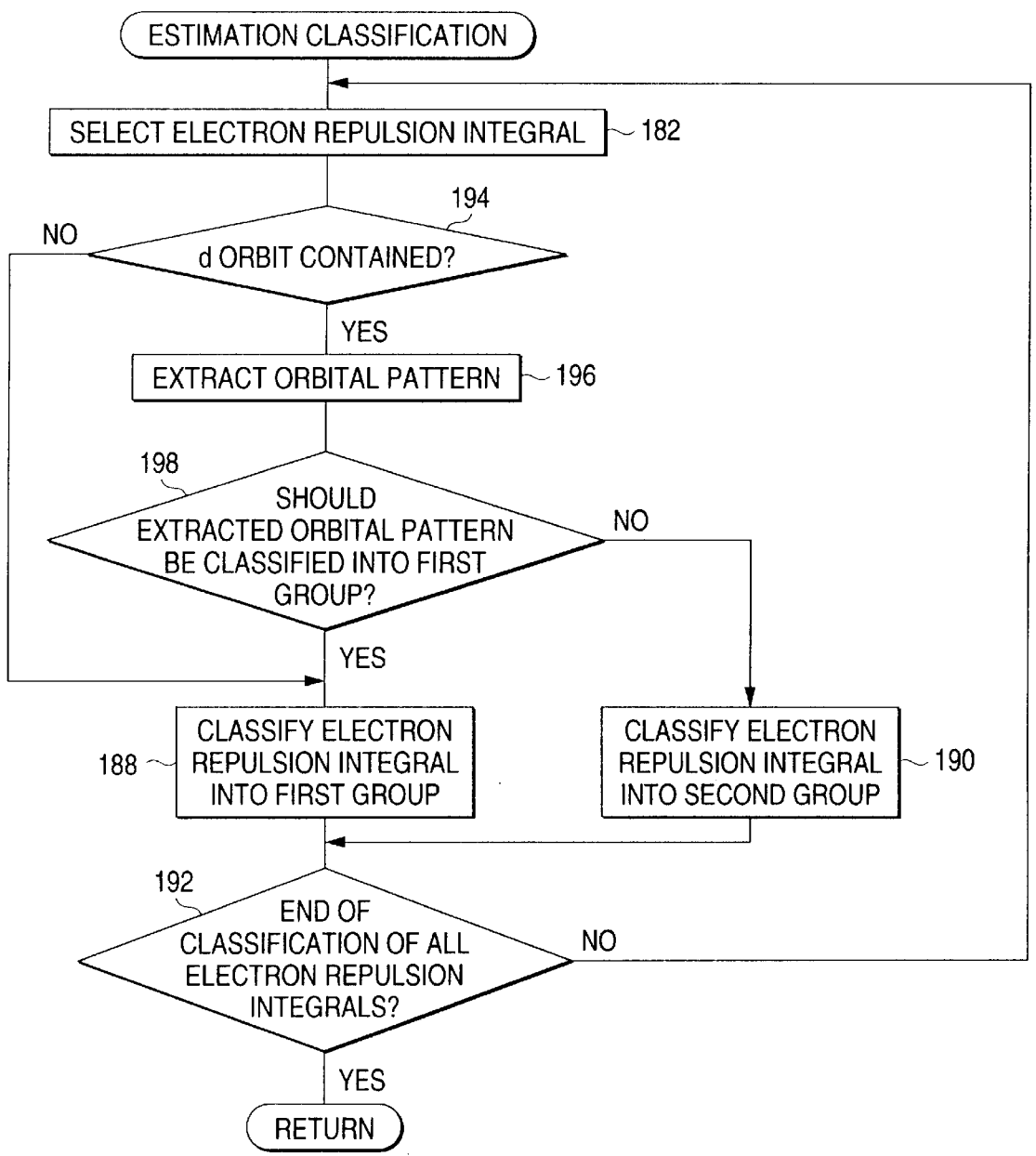
FIG. 8 is a flowchart to show a specific flow of estimation classification process of electron repulsion integrals according to a fourth embodiment of the invention.

Next, a specific example of classifying electron repulsion integrals in response to the magnitude of angular momenta of basis functions will be discussed with reference to a flowchart of FIG. 8. That is, when basis function index R is received from a host computer 1 at step 150 in FIG. 5, an estimation classification routine in FIG. 8 is executed in place of step 152 in FIG. 5.

First, at step 182, one is selected from among the electron repulsion integrals to be calculated and at step 194, whether or not a d orbit is contained in the angular momenta of the four basis functions constituting the selected electron repulsion integral is determined. If no d orbit is contained, control goes to step 188 at which the electron repulsion integral is classified into the first process group. On the other hand, if it is determined at step 194 that a d orbit is contained, control goes to step 194 at which an orbital pattern is extracted. At step 198, whether or not the extracted orbital pattern should be classified into the first process group is determined. If it is determined at step 198 that the extracted orbital pattern should be classified into the first process group, control goes to step 188 at which the electron repulsion integral is classified into the first process group. On the other hand, if it is determined at step 198 that the extracted orbital pattern should not be classified into the first process group, control goes to step 190 at which the electron repulsion integral is classified into the second process group.

The electron repulsion integrals are thus classified according to the orbital pattern extracted for each electron repulsion integral containing a d orbit in the angular momenta of the four basis functions constituting the electron repulsion integral, whereby the calculation time spent for unnecessary auxiliary integrals can be shortened and the calculation efficiency can be improved.

Fifth embodiment

If electron repulsion integrals are classified into first and second process groups as in the third or fourth embodiment, the calculation efficiency may lower. In a fifth embodiment of the invention, electron repulsion integral [dd, ds] will be discussed as an example. Parts identical with or similar to those previously described in the embodiments are denoted by the same reference numerals in the fifth embodiment and will not be discussed in detail again.

First, assuming that the electron repulsion integral [dd, ds] is classified into a second process group, at steps 124–130 in FIG. 5, calculation of the second process group is started, the electron repulsion integral calculation sequence is determined, calculation of the electron repulsion integral [dd, ds] is started, and coefficients [ss, ss]$^{(m)}$ are calculated, then auxiliary integrals to auxiliary integrals [pp, pp]$^{(m)}$ are calculated.

Although auxiliary integrals [pp, ps]$^{(m)}$, [pp, ss]$^{(m)}$, [ps, ps]$^{(m)}$, etc., are used in the calculation of the electron repulsion integral [dd, ds], auxiliary integrals with the angular momentum of the fourth basis function being p, such as [ss, sp]$^{(m)}$ or [pp, pp]$^{(m)}$, are not used, because the angular momentum of the fourth basis function of the electron repulsion integral [dd, ds] is 0 and the angular momentum of the fourth basis function of each auxiliary integral appearing when the electron repulsion integral is expanded from expression (9) cannot become 1 or more. Thus, if an integral with the angular momentum of the fourth basis function being p or d orbit is not contained in the type classified according to combination of atomic nucleus coordinates and orbital exponent, it becomes insignificant to calculate all auxiliary integrals to [pp, pp]$^{(m)}$, and the calculation efficiency worsens.

Generally, if the ith one (i is 1 to 4) of four basis functions constituting a electron repulsion integral is an s orbit, auxiliary integrals with the angular momentum of the ith basis function being p or more are not used.

Then, in the embodiment, when the second process group is calculated, electron repulsion integrals are classified into types according to combination of atomic nucleus coordinates and orbital exponent, then auxiliary integrals are calculated in response to the angular momentum of the ith one of the four basis functions constituting a electron repulsion integral.

Figure 9:
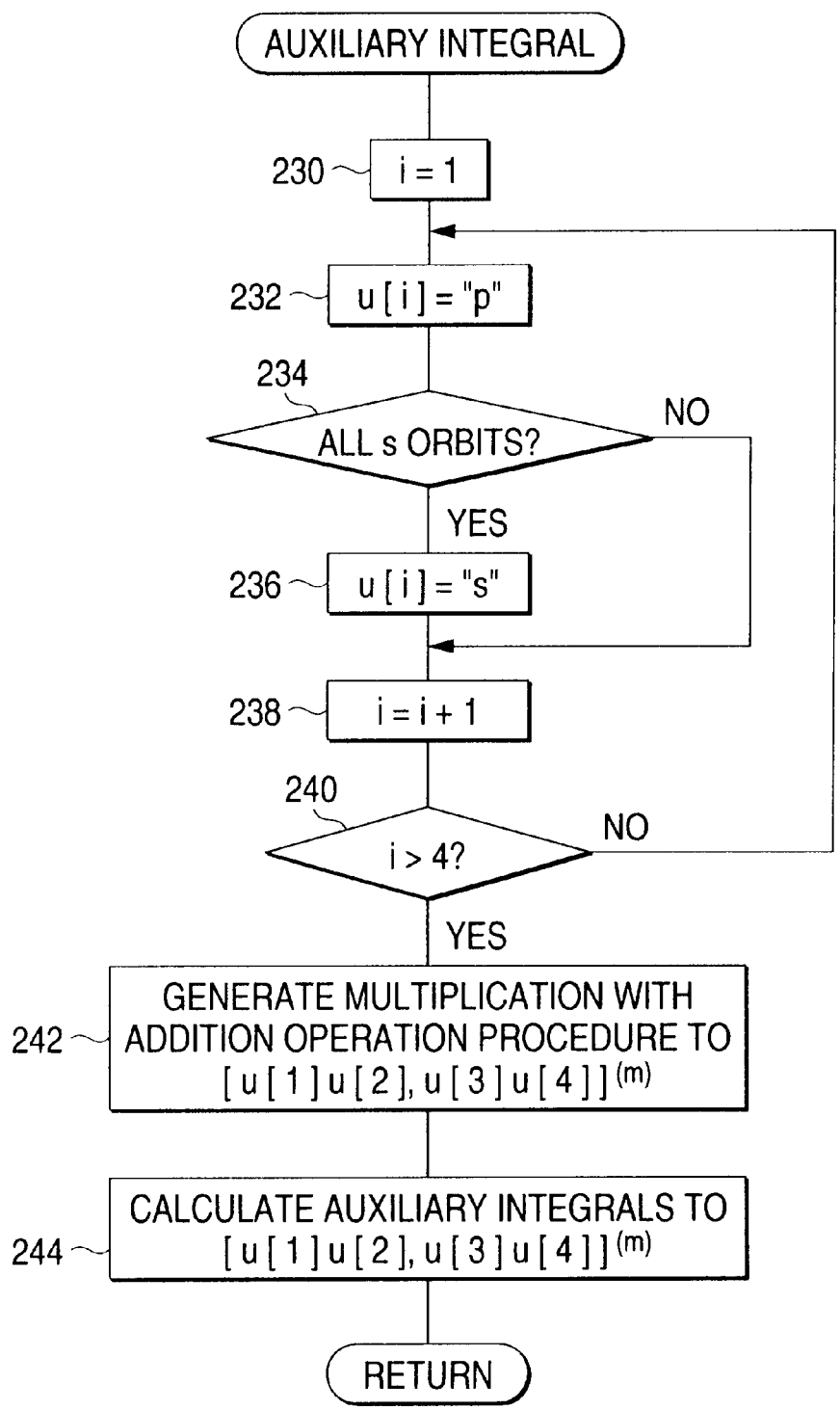
FIG. 9 is a flowchart to show a process flow of improving efficiency of auxiliary integrals according to a fifth embodiment of the invention.

More particularly, steps 128 and 130 in FIG. 5 are replaced with steps in FIG. 9. First, at step 126 in FIG. 5, coefficients and auxiliary integrals [ss, ss]$^{(m)}$ required for product sum calculation are generated and are stored in a data memory 15, then control goes to step 230 in FIG. 9 and i is set to 1 so as to examine the first one of the basis functions constituting the electron repulsion integral. At step 232, the upper limit of the angular momentum of the first basis function constituting the auxiliary integral to be calculated (u[i]="p"). In the embodiment, the angular momentum of the basis function is represented by element u[i] of array u ($1 \leq i \leq 4$).

At step 234, the first basis functions of all electron repulsion integrals of the type classified according to combination of atomic nucleus coordinates and orbital exponent are checked to see if all are s orbits. If it is determined at step 234 that all are s orbits, control goes to step 236 at which the element u[i] of the array u is set to s orbit. If it is determined at step 234 that not all are s orbits, the element u[i] remains p orbit and control goes to step 238 at which the basis function position is incremented by one (i=i+1), then control goes to step 240 at which whether or not i>4 is determined for determining whether all basis functions constituting the electron repulsion integral have been checked. If $i \leq 4$, no is returned and control returns to step 232; if i>4, yes is returned and control goes to step 242.

At the termination of checking the first to fourth basis functions as described above, control goes to step 242 at which a multiplication with addition operation procedure to auxiliary integrals $[u[1]u[2], u[3]u[4]]^{(m)}$ is generated in place of multiplication with addition operation generation to auxiliary integrals $[pp, pp]^{(m)}$ at step 128 in FIG. 5 and is stored in an instruction memory. At step 244, a multiplication with addition operation start instruction is output to a multiplication with addition operation circuit 16 for calculating auxiliary integrals according to the multiplication with addition operation procedure stored in the instruction memory (equivalent to the calculation of the auxiliary integrals to auxiliary integrals $[pp, pp]^{(m)}$ at step 130 in FIG. 5).

Since calculation of unnecessary auxiliary integrals is not executed in the electron repulsion integral calculation in the embodiment, the calculation time spent for unnecessary auxiliary integrals can be shortened and the calculation efficiency can be improved.

In the embodiments, only the processor units 20 different in configuration from the conventional processor units 4 are used, but the conventional processor units 4 may be contained.

As we have discussed, according to the invention of aspect 1, of a recursive multiplication with addition operation procedure, a small multiplication with addition operation procedure from the lowest degree to the boundary degree is found and is stored in the procedure storage means and the data according to the procedure is used to perform a large multiplication with addition operation procedure from the degree exceeding the boundary degree to the highest degree, so that recursive multiplication with addition operation of large degree can be executed at high speed using the procedure storage means having a small capacity.

According to the invention of aspect 2, computation processes according to a plurality of recursive multiplication with addition operation procedures different in degree are classified into the first multiplication with addition operation group to the boundary degree and the second multiplication with addition operation group exceeding the boundary degree. Thus, recursive multiplication with addition operation can be executed at high speed using the procedure storage means having a small capacity regardless of the magnitude of the order.

According to the invention of aspect 3, when an electron repulsion integral used for molecular orbital calculation is found according to recursive multiplication with addition operation procedure for performing computation of predetermined degree using recursion formula representing the physical amount containing the product of basis functions constituting molecular orbital in an integral format, a small multiplication with addition operation procedure from the lowest degree to the boundary degree is found and the data according to the procedure is used to perform a large multiplication with addition operation procedure from the degree exceeding the boundary degree to the highest degree, so that the electron repulsion integral used for molecular orbital calculation can be computed at high speed by performing recursive multiplication with addition operation of large degree.

According to the invention of aspect 4, when each of different electron repulsion integrals used for molecular orbital calculation is found according to recursive multiplication with addition operation procedure for performing computation of predetermined degree using recursion formula representing the physical amount containing the product of basis functions constituting molecular orbital in an integral format, computation processes according to a plurality of recursive multiplication with addition operation procedures different in degree are classified into the first multiplication with addition operation group to the boundary degree and the second multiplication with addition operation group exceeding the boundary degree. Thus, the electron repulsion integral used for molecular orbital calculation can be computed at high speed by performing recursive multiplication with addition operation regardless of the magnitude of the order of the electron repulsion integral.

What is claimed is:

1. A large-scale multiplication with addition (mul-add operation) method comprising the steps of:

to perform mul-add operation of predetermined degree as recursive mul-add operation of lower-degree operation than the predetermined degree, generating a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation;

storing the generated small multiplication with addition operation procedure in procedure storage means;

performing multiplication with addition operation according to the stored small multiplication with addition operation procedure, thereby generating necessary data for multiplication with addition operation from degree exceeding the boundary degree to the highest degree;

generating a multiplication with addition operation procedure to the highest degree from the degree exceeding the boundary degree as a large multiplication with addition operation procedure;

replacing the small multiplication with addition operation procedure stored in said procedure storage means with the generated large multiplication with addition operation procedure; and performing multiplication with addition operation according to the large multiplication with addition operation procedure stored in said procedure storage means using the generated data.

2. The large-scale multiplication with addition operation method of claim 1, wherein the boundary degree is defined based on a storage capacity of said procedure storage means.

3. A large-scale multiplication with addition operation method comprising the steps of:
- to perform mul-add operation of predetermined degree as recursive mul-add operation of lower-degree operation than the predetermined degree,
- classifying computation processes according to a plurality of recursive multiplication with addition operation procedures different in degree, of a mul-add procedure of recursive multiplication with addition operation from lowest-degree computation corresponding to the predetermined-degree computation into a first multiplication with addition operation group of small degree from the lowest degree to a previously defined boundary degree and a second multiplication with addition operation group of large degree exceeding the boundary degree;
- in the computation processes of the first multiplication with addition operation group,
- generating a multiplication with addition operation procedure from the lowest degree to the highest degree as a specific multiplication with addition operation procedure,
- storing the generated specific multiplication with addition operation procedure in procedure storage means,
- performing multiplication with addition operation according to the stored specific multiplication with addition operation procedure; and
- in the computation processes of the second multiplication with addition operation group,
- generating a multiplication with addition operation procedure from the lowest degree to the previously defined boundary degree as a small multiplication with addition operation procedure,
- storing the generated small multiplication with addition operation procedure in said procedure storage means,
- performing multiplication with addition operation according to the stored small multiplication with addition operation procedure, thereby
- generating necessary data for a multiplication with addition operation procedure from degree exceeding the boundary degree to the highest degree,
- generating the multiplication with addition operation procedure from the degree exceeding the boundary degree to the highest degree as a large multiplication with addition operation procedure,
- replacing the stored small multiplication with addition operation procedure with the generated large multiplication with addition operation procedure, and
- performing multiplication with addition operation according to the large multiplication with addition operation procedure using the generated data.

4. The large-scale multiplication with addition operation method of claim 3, wherein
- the boundary degree is defined based on a storage capacity of said procedure storage means.

5. The large-scale multiplication with addition operation method of claim 3, wherein
- a size of the recursive multiplication with addition operation procedure is predicted for each of the computation processes according to the recursive multiplication with addition operation procedures different in degree and wherein when the predicted size is equal to or less than a predetermined amount,
- the corresponding recursive multiplication with addition operation procedure is classified into a first multiplication with addition operation process group and when the predicted size is greater than the predetermined amount,
- the corresponding recursive multiplication with addition operation procedure is classified into a second multiplication with addition operation process group.

6. The large-scale multiplication with addition operation method of claim 3, wherein
- the computation processes according to the recursive multiplication with addition operation procedures different in degree are classified into a first multiplication with addition operation process group not containing a previously defined boundary degree and a second multiplication with addition operation process group containing the boundary degree.

7. A large-scale multiplication with addition operation method comprising the steps of:
- with computation of an electron repulsion integral used for molecular orbital calculation as operation of predetermined degree using recursion formula representing a physical amount containing a product of basis functions constituting molecular orbital in an integral format,
- generating and storing a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation;
- performing multiplication with addition operation according to the stored small multiplication with addition operation procedure, thereby
- generating necessary data for multiplication with addition operation from degree exceeding the boundary degree to the highest degree;
- generating a multiplication with addition operation procedure to the highest degree from the degree exceeding the boundary degree as a large multiplication with addition operation procedure and replacing the stored small multiplication with addition operation procedure with t he generated large multiplication with addition operation procedure; and
- performing multiplication with addition operation u sing the generated data and according to the large multiplication with addition operation procedure.

8. The large-scale multiplication with addition operation method of claim 7, wherein
- the generated small multiplication with addition operation procedure is stored in procedure storage means and the small multiplication with addition operation procedure stored in said procedure storage means is replaced with the generated large multiplication with addition operation procedure.

9. The large-scale multiplication with addition operation method of claim 8, wherein
- the boundary degree is defined based on a storage capacity of said procedure storage means.

10. A large-scale multiplication with addition operation method comprising the steps of:
- with computation of an electron repulsion integral used for molecular orbital calculation as operation of predetermined degree using recursion formula representing a physical amount containing a product of basis functions constituting molecular orbital in an integral format, classifying computation processes according to a plurality of recursive multiplication with addition operation procedures different in degree, of a product sum procedure of recursive multiplication with addition operation from lowest-degree computation corresponding to the predetermined-degree computation into a first multiplication with addition operation group of small degree from the lowest degree to a previously defined boundary degree and a second multiplication with addition operation group of large degree exceeding the boundary degree;

in the computation of the first multiplication with addition operation group, generating a multiplication with addition operation procedure from the lowest degree to the highest degree as a specific multiplication with addition operation procedure and performing multiplication with addition operation according to the generated specific multiplication with addition operation procedure; and in the computation of the second multiplication with addition operation group, generating a multiplication with addition operation procedure from the lowest degree to the previously defined boundary degree as a small multiplication with addition operation procedure, storing the generated small multiplication with addition operation procedure, performing multiplication with addition operation according to the stored small multiplication with addition operation procedure, thereby generating necessary data for a multiplication with addition operation procedure from degree exceeding the boundary degree to the highest degree, generating the multiplication with addition operation procedure from the degree exceeding the boundary degree to the highest degree as a large multiplication with addition operation procedure, replacing the stored small multiplication with addition operation procedure with the generated large multiplication with addition operation procedure, and performing multiplication with addition operation according to the large multiplication with addition operation procedure using the generated data.

11. The large-scale multiplication with addition operation method of claim 10, wherein the generated small multiplication with addition operation procedure is stored in procedure storage means and the small multiplication with addition operation procedure stored in said procedure storage means is replaced with the generated large multiplication with addition operation procedure.

12. The large-scale multiplication with addition operation method of claim 10, wherein a size of the recursive multiplication with addition operation procedure is predicted for each of the computation processes according to the recursive multiplication with addition operation procedures different in degree and wherein when the predicted size is equal to or less than a predetermined amount, the corresponding recursive multiplication with addition operation procedure is classified into a first multiplication with addition operation process group and when the predicted size is greater than the predetermined amount, the corresponding recursive multiplication with addition operation procedure is classified into a second multiplication with addition operation process group.

13. The large-scale multiplication with addition operation method of claim 10, wherein the computation processes according to the recursive multiplication with addition operation procedures different in degree are classified into a first multiplication with addition operation process group not containing a previously defined boundary degree and a second multiplication with addition operation process group containing the boundary degree.

14. A large-scale multiplication with addition operation system comprising:

an instruction memory for storing at least a part of a multiplication with addition operation procedure for performing computation of predetermined degree as recursive multiplication with addition operation of lower-degree computation than the predetermined degree;

multiplication with addition operation means for performing multiplication with addition operation according to the multiplication with addition operation procedure stored in said instruction memory;

a data memory for storing the multiplication with addition operation result; and control means for generating a multiplication with addition operation procedure from the lowest degree to a previously defined boundary degree as a small multiplication with addition operation procedure, of a product sum procedure of recursive multiplication with addition operation from lowest-degree computation corresponding to the predetermined-degree computation, storing the generated small multiplication with addition operation procedure in said instruction memory, storing the multiplication with addition operation result produced according to the small multiplication with addition operation procedure in said data memory, generating a multiplication with addition operation procedure from the degree exceeding the boundary degree to the highest degree as a large multiplication with addition operation procedure;

replacing the small multiplication with addition operation procedure stored in said instruction memory with the generated large multiplication with addition operation procedure, and controlling the mul-add operation means to perform multiplication with addition operation using the computation result stored in said data memory and according to the large multiplication with addition operation procedure.

* * * * *